(12) United States Patent
Powell et al.

(10) Patent No.: US 11,708,444 B2
(45) Date of Patent: *Jul. 25, 2023

(54) ACRYLIC POLYESTER RESIN AND AN AQUEOUS COATING COMPOSITION CONTAINING THE SAME

(71) Applicant: PPG Industries Ohio, Inc., Cleveland, OH (US)

(72) Inventors: Adam Bradley Powell, Wexford, PA (US); William H. Retsch, Jr., Allison Park, PA (US); Edward R. Millero, Jr., Gibsonia, PA (US); John M. Dudik, Apollo, PA (US); Christopher P. Kurtz, Millvale, PA (US); Michael Olah, Pittsburgh, PA (US); Anand K. Atmuri, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 135 days.

This patent is subject to a terminal disclaimer.

(21) Appl. No.: 17/315,470

(22) Filed: May 10, 2021

(65) Prior Publication Data

US 2021/0261710 A1    Aug. 26, 2021

Related U.S. Application Data

(63) Continuation of application No. 16/468,858, filed as application No. PCT/US2017/065783 on Dec. 12, 2017, now abandoned.

(60) Provisional application No. 62/432,994, filed on Dec. 12, 2016.

(51) Int. Cl.
| | |
|---|---|
| *C09D 151/08* | (2006.01) |
| *C08F 283/01* | (2006.01) |
| *C08F 290/06* | (2006.01) |
| *C08F 283/02* | (2006.01) |
| *C08G 12/32* | (2006.01) |
| *C08J 3/24* | (2006.01) |
| *C09D 151/00* | (2006.01) |
| *C08G 63/183* | (2006.01) |
| *C08G 81/02* | (2006.01) |
| *C08K 5/00* | (2006.01) |
| *C08K 5/3492* | (2006.01) |
| *C08L 51/08* | (2006.01) |
| *C08G 63/199* | (2006.01) |
| *C08L 87/00* | (2006.01) |
| *C09D 5/03* | (2006.01) |
| *B05D 7/22* | (2006.01) |

(52) U.S. Cl.
CPC ........ *C08F 290/061* (2013.01); *C08F 283/01* (2013.01); *C08F 283/02* (2013.01); *C08G 12/32* (2013.01); *C08G 63/183* (2013.01); *C08G 63/199* (2013.01); *C08G 81/027* (2013.01); *C08J 3/24* (2013.01); *C08K 5/0025* (2013.01); *C08K 5/3492* (2013.01); *C08L 51/08* (2013.01); *C08L 87/005* (2013.01); *C09D 5/03* (2013.01); *C09D 151/003* (2013.01); *C09D 151/08* (2013.01); *B05D 7/227* (2013.01); *B05D 2502/00* (2013.01); *C08G 2150/90* (2013.01)

(58) Field of Classification Search
None
See application file for complete search history.

(56) References Cited

U.S. PATENT DOCUMENTS

| | | | |
|---|---|---|---|
| 4,119,680 A | 10/1978 | Vachon | |
| 4,395,286 A * | 7/1983 | Sturwold | C09D 5/08 106/14.13 |
| 5,932,641 A | 8/1999 | Blanchard et al. | |
| 6,576,717 B1 | 6/2003 | Kuo | |
| 7,745,508 B2 | 6/2010 | Kiefer-Liptak | |
| 7,803,415 B2 | 9/2010 | Kiefer-Liptak | |
| 8,168,721 B2 | 5/2012 | Marsh et al. | |
| 8,324,316 B2 | 12/2012 | Powell et al. | |
| 8,524,834 B2 | 9/2013 | Marsh et al. | |
| 8,580,872 B2 | 11/2013 | Kuo et al. | |
| 9,029,460 B2 | 5/2015 | Marsh et al. | |
| 9,221,977 B2 | 12/2015 | Ambrose | |
| 9,487,619 B2 | 11/2016 | Kuo et al. | |
| 11,421,067 B2 * | 8/2022 | Powell | C08F 290/061 |
| 2003/0113462 A1 | 6/2003 | Hirose et al. | |
| 2007/0080065 A1 | 4/2007 | Oravitz et al. | |
| 2010/0260954 A1 | 10/2010 | Stenson et al. | |

(Continued)

FOREIGN PATENT DOCUMENTS

| | | |
|---|---|---|
| EP | 1384764 A2 | 1/2004 |
| JP | H06329876 A | 11/1994 |

(Continued)

*Primary Examiner* — David J Buttner

(74) *Attorney, Agent, or Firm* — Shantanu C. Pathak

(57) ABSTRACT

There is described an acrylic polyester resin, obtainable by grafting an acrylic polymer with a polyester material. The polyester material is obtainable by polymerizing (i) a polyacid component, with (ii) a polyol component. At least one of the polyacid component and/or the polyol component comprises a monomer having an aliphatic group containing at least 15 carbon atoms. At least one of the polyacid component and/or the polyol component comprises a functional monomer operable to impart functionality on to the polyester resin, such that an acrylic polymer may be grafted with the polyester material via the use of said functionality. Also provided is an aqueous coating composition comprising the acrylic polyester resin and a packaging coated with the composition.

20 Claims, No Drawings

(56) References Cited

U.S. PATENT DOCUMENTS

| | | | |
|---|---|---|---|
| 2012/0282475 A1* | 11/2012 | Fuhry | C08F 283/01 |
| | | | 524/502 |
| 2013/0072628 A1 | 3/2013 | Crawford et al. | |
| 2016/0115347 A1 | 4/2016 | Kuo et al. | |
| 2021/0163780 A1* | 6/2021 | Retsch, Jr. | C09D 151/08 |
| 2022/0348706 A1* | 11/2022 | Powell | C08G 81/027 |

FOREIGN PATENT DOCUMENTS

| | | |
|---|---|---|
| JP | 2004026913 A | 1/2004 |
| JP | 2004223865 A | 8/2004 |
| JP | 2004224905 A | 8/2004 |
| WO | 2005080517 A1 | 9/2005 |
| WO | 2007049028 | 5/2007 |
| WO | 07/143407 A1 | 12/2007 |
| WO | 2008036629 A2 | 3/2008 |
| WO | 2010118356 A1 | 10/2010 |

* cited by examiner

ACRYLIC POLYESTER RESIN AND AN AQUEOUS COATING COMPOSITION CONTAINING THE SAME

The present invention relates to an acrylic polyester resin and aqueous coating composition containing the same. The invention also relates to a packaging having a coating on at least a portion thereof, the coating being derived from the aqueous coating composition. The invention also extends to methods of preparing the acrylic modified resin, methods of preparing the aqueous coating composition and methods of coating a packaging.

A wide variety of coatings have been used to coat food and/or beverage containers. The coating systems typically have certain properties such as being capable of high speed application, having acceptable adhesion to the substrate, being safe for food contact and having properties that are suitable for their end use. Typically, coatings have one, or maybe two, of these advantageous properties depending on their final end use.

There is a desire for the coatings to be aqueous, rather than entirely solvent borne. However, many such coatings rely on the presence of a polyester material as a film forming resin, but polyester materials do not usually provide adequate solubility in water. Furthermore, aqueous coatings comprising polyester materials can display poor shelf life and poor coating qualities.

It is an object of aspects of the present invention to address the above mentioned or other problems.

According to a first aspect of the present invention, there is provided an acrylic polyester resin, obtainable by grafting an acrylic polymer and a polyester material, the polyester material being obtainable by polymerizing:
  i) a polyacid component, with
  ii) a polyol component,
  wherein at least one of the polyacid component and/or the polyol component comprises a monomer having an aliphatic group containing at least 15 carbon atoms,
  and wherein at least one of the polyacid component and/or the polyol component comprises a functional monomer operable to impart functionality on to the polyester resin, such that an acrylic polymer may be grafted with the polyester material via the use of said functionality.

According to a further aspect of the present invention, there is provided an aqueous coating composition, the aqueous coating composition comprising:
  a) an acrylic polyester resin, obtainable by grafting an acrylic polymer and a polyester material, the polyester material being obtainable by polymerizing:
    i) a polyacid component, with
    ii) a polyol component, including wherein at least one of the polyacid component and/or the polyol component comprises a monomer having an aliphatic group containing at least 15 carbon atoms,
    and wherein at least one of the polyacid component and/or the polyol component comprises a functional monomer operable to impart functionality on to the polyester resin, such that an acrylic polymer may be grafted with the polyester material via the use of said functionality,
  b) a crosslinking material.

According to a further aspect of the present invention, there is provided a packaging coated on at least a portion thereof with a coating, the coating being derived from an aqueous coating composition, the aqueous coating composition comprising:
  a) an acrylic polyester resin, obtainable by grafting an acrylic polymer and a polyester material, the polyester material being obtainable by polymerizing:
    i) a polyacid component, with
    ii) a polyol component, including
      wherein at least one of the polyacid component and/or the polyol component comprises a monomer having an aliphatic group containing at least 15 carbon atoms,
    and wherein at least one of the polyacid component and/or the polyol component comprises a functional monomer operable to impart functionality on to the polyester resin, such that an acrylic polymer may be grafted with the polyester material via the use of said functionality,
  b) a crosslinking material.

Suitably, coating of the packaging is a cured coating.

Advantageously, the inclusion of a monomer having an aliphatic group containing at least 15 carbon atoms in the polyester material has been identified as providing improved chemical resistance. In particular, the inclusion of a monomer having an aliphatic group containing at least 15 carbon atoms in the polyester material provides improved citric acid retort. It is particularly surprising that an improvement in the citric acid resistance in a polyester coating can be achieved without significantly compromising the other necessary coatings properties needed for packaging applications.

Suitably, the acrylic polyester resin comprises an acrylic modified polyester resin, which may be a polyester material having an acrylic polymer grafted thereonto. Suitably, the acrylic modified polyester resin may be prepared by grafting an acrylic polymer onto a preformed polyester material. Suitably, the acrylic modified polyester resin may be prepared by graft polymerising an acrylic monomer mixture onto a preformed polyester material.

At least one of the polyacid component or the polyol component comprises a functional monomer, operable to impart functionality to the polyester resin. Suitably, one of the polyacid component or the polyol component comprises a functional monomer, operable to impart functionality to the polyester resin. The functionality is such that an acrylic polymer may be grafted onto the polyester material via the use of said functionality. The functionality may comprise ethylenic unsaturation, carboxylic acid functionality or epoxy functionality. The functionality may be in the backbone of the polyester material or pendant therefrom.

The functional monomer may comprise an ethylenically unsaturated monomer, which ethylenically unsaturated monomer may be operable to impart ethylenically unsaturated functionality on the backbone of the polyester resin, or pendant therefrom. Suitably, the functionality comprises ethylenic unsaturation, which may be in the backbone of the polyester material.

Suitable functional monomers may be selected from one or more of the following: maleic acid, maleic anhydride, fumaric acid, itaconic anhydride, itaconic acid, citraconic anhydride, citraconic acid, aconitic acid, aconitic anhydride, oxalocitraconic acid, oxalocitraconic anhydride, mesaconic acid, mesaconic anhydride, phenyl maleic acid, phenyl maleic anhydride, t-butyl maleic acid, t-butyl maleic anhydride, monomethyl fumarate, monobutyl fumarate, nadic acid, nadic anhydride, methyl maleic acid, methyl maleic anhydride, and trimethylolpropane monoallyl ether.

Where the functional monomer is a polyacid, the functional monomer may be present as a proportion of the dry weight of the polyacid component in an amount of from 0.5 to 10 wt %, suitably from 1 to 5 wt %.

Where the functional monomer is a polyol, the functional monomer may be present as a proportion of the dry weight of the polyol component in an amount of from 0.5 to 10 wt %, suitably from 1 to 5 wt %.

The polyacid component and/or the polyol component comprises a monomer having an aliphatic group containing at least 15 carbon atoms.

The aliphatic group of the monomer having an aliphatic group (aliphatic group-containing monomer) may comprise at least 18 or 20 carbon atoms, such as at least 22, 24, 26, 28 or 30 carbon atoms. The aliphatic group of the aliphatic group-containing monomer may contain up to 50 carbon atoms, such as up to 46 carbon atoms or up to 44, 42, 40 or 38 carbon atoms.

The aliphatic group of the aliphatic group-containing monomer may comprise from 18 to 50 carbon atoms, such as from 20 to 46 carbon atoms, from 22 to 44 carbon atoms, from 24 to 42 carbon atoms, from 26 to 40 carbon atoms, from 28 to 38 carbon atoms, or from 30 to 38 carbon atoms.

The aliphatic group of the aliphatic group-containing monomer may be linear, branched, cyclic, interrupted by a heteroatom selected from oxygen, nitrogen and sulphur, substituted, saturated, and/or unsaturated. Suitably, the aliphatic group of the aliphatic group-containing monomer is branched. The aliphatic group of the aliphatic group-containing monomer may comprise a cyclic group. Suitably, the aliphatic group of the aliphatic group-containing monomer is saturated or monounsaturated. The aliphatic group of the aliphatic-group containing monomer may be branched and saturated. The aliphatic group of the aliphatic-group containing monomer may comprise a cyclic group and be saturated. The aliphatic group of the aliphatic group-containing monomer may have no substituents and/or not be interrupted by a heteroatom.

The branching of the aliphatic group may be monoalkyl or polyalkyl, wherein "alkyl" when used in relation to monoalkyl or polyalkyl branching may be $C_1$ to $C_{15}$, such as $C_1$ to $C_{10}$, $C_1$ to $C_8$, $C_1$ to $C_5$, or $C_1$ to $C_3$. Suitably the monoalkyl branching is methyl or ethyl or propyl or optionally a mixture thereof for polyalkyl branching. Suitably, the branching of the aliphatic group is polyalkyl.

The cyclic groups of the aliphatic group may be saturated or partially unsaturated cyclic aliphatic monocyclic or polycyclic ring systems which comprise from 3 to 20 carbon atoms, such as from 3 to 15, or from 3 to 12, or from 3 to 10, or from 3 to 8 carbon atoms, or from 3 to 6 carbon atoms.

The aliphatic-group containing monomer may comprise a ratio of acyclic carbon atoms to cyclic carbon atoms of at least 1:1, such as at least 2:1, at least 3:1, at least 4:1 or at least 5:1. By "cyclic carbon atoms" it is meant carbon atoms contained in a ring of a cyclic group.

The optional substituents of the aliphatic group of the aliphatic group-containing monomer may include aryl, halogen, cyano, nitro, $OR^{19}$, $OC(O)R_{20}$, $C(O)R^{21}$, $C(O)OR^{22}$, $NR^{23}R^{24}$, $C(O)NR^{25}R^{26}$, $C(S)R^{25}R^{26}$, $SR^{27}$, $C(O)SR^{27}$. Suitably, the optional substituents include $C_6$ to $C_{10}$ aryl, halogen, $OR^{19}$, $C(O)R^{21}$, and $SR^{27}$. $R^{19}$ to $R^{27}$ each independently represent hydrogen, alkyl (such as $C_1$ to $C_{10}$ alkyl), or aryl (such as $C_6$ to $C_{10}$ aryl).

The aliphatic group-containing monomer may be formed of the aliphatic group radical joined to the carboxyl or alcohol groups of the polyacid or polyol. The aliphatic-group containing monomer may have no aromatic groups.

The aliphatic group-containing monomer may be a diacid or a diol. Suitably the aliphatic group-containing monomer is a diacid.

The aliphatic group-containing monomer may be the dimerisation product of mono- or polyunsaturated fatty acids, esters thereof, and/or fatty alcohols. Suitably, the aliphatic group-containing monomer is the dimerisation product of mono- or polyunsaturated fatty acids and/or esters thereof. The aliphatic group-containing monomer may be a dimer fatty acid (also known as dimer fatty diacid) or a dimer fatty alcohol (also known as dimer fatty diol). Suitably, the aliphatic group-containing monomer is a dimer fatty acid.

The aliphatic group-containing monomer may be a dimer fatty acid or alcohol comprising from 18 to 50 carbon atoms, such as a dimer fatty acid or alcohol comprising from 20 to 46 carbon atoms, or a dimer fatty acid or alcohol comprising 22 to 44 carbon atoms, for example a dimer fatty acid or alcohol comprising from 24 to 42 carbon atoms, or a dimer fatty acid or alcohol comprising from 26 to 40 carbon atoms, or a dimer fatty acid or alcohol comprising from 28 to 38 carbon atoms, or a dimer fatty acid or alcohol comprising from 30 to 38 carbon atoms.

The aliphatic group-containing monomer may be a dimer fatty acid comprising 18 to 50 carbon atoms, such as a dimer fatty acid comprising 20 to 46 carbon atoms, or a dimer fatty acid comprising from 22 to 44 carbon atoms, for example a dimer fatty acid comprising from 24 to 42 carbon atoms, a dimer fatty acid comprising from 26 to 40 carbon atoms, a dimer fatty acid comprising from 28 to 38 carbon atoms, or a dimer fatty acid comprising from 30 to 38 carbon atoms.

The aliphatic group-containing monomer may be the dimerisation product of erucic acid, α-linolenic acid, stearidonic acid, eicosapentaenoic acid docosahexaenoic acid, linoleic acid, linolelaidic acid, γ-linolenic acid, dihomo-γ-linolenic acid, arachidonic acid, docosatetraenoic acid, palmitoleic acid, vaccenic acid, paillinic acid, oleic acid, elaidic acid, gondoic acid, erucic acid, nervonic acid, and/or mead acid.

The aliphatic group-containing monomer may be the dimerisation product of erucic acid, linolenic acid, linoleic acid, and/or oleic acid.

Suitably, only one of the polyacid component or the polyol component comprises a monomer having an aliphatic group containing at least 15 carbon atoms, preferably the polyacid component comprises a monomer having an aliphatic group containing at least 15 carbon atoms. The polyester material may be a hydrophobic polyester material in which the polyacid component comprises a monomer having an aliphatic group containing at least 15 carbon atoms.

The polyacid component suitably comprises one or more polyacid. "Polyacid" and like terms as used herein, refers to a compound having two or more carboxylic acid groups, such as two (diacids), three (triacids) or four acid groups, and includes an ester of the polyacid (wherein one or more of the acid groups is esterified) or an anhydride. The polyacid is suitably an organic polyacid.

The carboxylic acid groups of the polyacid may be connected by a bridging group selected from: an alkylene group; an alkenylene group; an alkynylene group; or an arylene group.

The polyester material may be formed from any suitable polyacid. Suitable examples of polyacids include, but are not limited to the following: maleic acid; fumaric acid; itaconic acid; adipic acid; azelaic acid; succinic acid; sebacic acid; glutaric acid; decanoic diacid; dodecanoic diacid; phthalic acid; isophthalic acid; 5-tert-butylisophthalic acid; tetrachlorophthalic acid; tetrahydrophthalic acid; trimellitic acid; naphthalene dicarboxylic acid; naphthalene tetracarboxylic acid; terephthalic acid; hexahydrophthalic acid; methylhexahydrophthalic acid; dimethyl terephthalate; cyclohexane dicarboxylic acid; chlorendic anhydride; 1,3-cyclohexane dicarboxylic acid; 1,4-cyclohexane dicarboxylic acid; tricyclodecane polycarboxylic acid; endomethylene tetrahydrophthalic acid; endoethylene hexahydrophthalic acid; cyclohexanetetra carboxylic acid; cyclobutane tetracarboxylic; esters and anhydrides of all the aforementioned acids and combinations thereof.

The polyacid component may comprise one or more diacid. Suitable examples of diacids include, but are not limited to the following: phthalic acid; isophthalic acid; terephthalic acid; 1,4 cyclohexane dicarboxylic acid; succinic acid; adipic acid; azelaic acid; sebacic acid; fumaric acid; 2,6-naphthalene dicarboxylic acid; orthophthalic acid; phthalic anhydride; tetrahydrophthalic anhydride; maleic anhydride; succinic anhydride; itaconic anhydride; di-ester materials, such as dimethyl ester derivatives for example dimethyl isophtalate, dimethyl terephthalate, dimethyl 1,4-cyclohexane dicarboxylate, dimethyl 2,6-naphthalene di carboxylate, dimethyl fumarate, dimethyl orthophthalate, dimethylsuccinate, dimethyl glutarate, dimethyl adipate; esters and anhydrides of all the aforementioned acids; and mixtures thereof.

The polyacid component may comprise the aliphatic group-containing monomer and one or more further polyacids, suitably comprise the aliphatic group-containing monomer and one or more further diacids.

Suitably, the polyacid component comprises one or more of the following: terephthalic acid (TPA), isophthalic acid (IPA), dimethyl isophthalic acid, 1,4 cyclohexane dicarboxylic acid, hexahydrophthalic anhydride, 2,6-naphthalene dicarboxylic acid, phthalic anhydride, maleic anhydride, fumaric anhydride.

Suitably, the polyacid component comprises the aliphatic group-containing monomer and one or more of the following: terephthalic acid (TPA), isophthalic acid (IPA), dimethyl isophthalic acid, 1,4 cyclohexane dicarboxylic acid, hexahydrophthalic anhydride, 2,6-naphthalene dicarboxylic acid, phthalic anhydride, maleic anhydride, fumaric anhydride.

The polyacid component may comprise one or more of the following: dimethyl terephthalate, isophthalic acid, hexahydrophthalic anhydride, cyclohexane 1,4-dicarboxylic acid.

The polyacid component may comprise the aliphatic group-containing monomer and one or more of the following: dimethyl terephthalate, isophthalic acid, hexahydrophthalic anhydride, cyclohexane 1,4-dicarboxylic acid.

The polyol component suitably comprises one or more polyol. "Polyol" and like terms, as used herein, refers to a compound having two or more hydroxyl groups, such as two (diols), three (triols) or four hydroxyl groups (tetrols). The hydroxyl groups of the polyol may be connected by a bridging group selected from: an alkylene group; an alkenylene group; an alkynylene group; or an arylene group. Suitably the polyol is an organic polyol.

The polyester material may be formed from any suitable polyol. Suitable examples of polyols include, but are not limited to the following: 2,2,4,4-tetraalkylcyclobutane-1,3-diol (TACD); alkylene glycols, such as ethylene glycol; propylene glycol; diethylene glycol; dipropylene glycol; triethylene glycol; tripropylene glycol; hexylene glycol; polyethylene glycol; polypropylene glycol and neopentyl glycol; hydrogenated bisphenol A; cyclohexanediol; propanediols including 1,2-propanediol; 1,3-propanediol; butyl ethyl propanediol; 2-methyl-1,3-propanediol; and 2-ethyl-2-butyl-1,3-propanediol; butanediols including 1,4-butanediol; 1,3-butanediol; and 2-ethyl-1,4-butanediol; pentanediols including trimethyl pentanediol and 2-methylpentanediol; cyclohexanedimethanol; hexanediols including 1,6-hexanediol; caprolactonediol (for example, the reaction product of epsilon-capro lactone and ethylene glycol); hydroxyalkylated bisphenols; polyether glycols, for example, poly(oxytetramethylene) glycol; trimethylol propane; pentaerythritol; di-pentaerythritol; trimethylol ethane; trimethylol butane; dimethylol cyclohexane; bio-derived polyols such as glycerol, sorbitol and isosorbide; and the like or combinations thereof.

The polyol component may comprise one or more diol. The polyol component may comprise any suitable diol. Suitable examples of diols include, but are not limited to the following: 2,2,4,4-tetraalkylcyclobutane-1,3-diol (TACD); ethylene glycol; 1,2-propane diol; 1,3-propane diol; 1,2-butandiol; 1,3-butandiol; 1,4-butandiol; but-2-ene 1,4-diol; 2,3-butane diol; 2-methyl 1,3-propane diol; 2,2'-dimethyl 1,3-propanediol (neopentyl glycol); 1,5 pentane diol; 3-methyl 1,5-pentanediol; 2,4-diethyl 1,5-pentane diol; 1,6-hexane diol; 2-ethyl 1,3-hexane diol; diethylene glycol; triethylene glycol; dipropylene glycol; tripropylene glycol; 2,2,4-trimethyl pentane 1,3-diol; 1,4 cyclohexane dimethanol; tricyclodecane dimethanol; isosorbide; 1,4-cyclohexane diol; 1,1'-isopropylidene-bis (4-cyclohexanol); and mixtures thereof.

The polyol component may comprise one or more polyols having at least three hydroxyl groups, such as one or more selected from trimethylol propane; pentaerythritol; di-pentaerythritol; trimethylol ethane; trimethylol butane; and bio-derived polyols such as one or more selected from glycerol and sorbitol. Suitably, the polyol component having at least three hydroxyl groups comprises a triol or tetrol, such as one or more selected from trimethylol propane; pentaerythritol; trimethylol ethane; trimethylol butane; and glycerol. More suitably, the polyol component having at least three hydroxyl groups comprises a triol, such as one or more of trimethylol propane; trimethylol ethane; and trimethylol butane, for example trimethylol propane.

The polyol having at least three hydroxyl groups may be present as a proportion of the dry weight of the polyol component in an amount of from 0.1 to 10 wt %, such as from 0.5 to 8 wt % or from 0.7 to 6 wt %, for example from 0.8 to 5 wt % or from 0.9 to 4 wt %, suitably from 1 to 3 wt % or from 1 to 2 wt %.

In particular the polyol component may comprise one or more of the following: 2-methyl propanediol (2-MPD), neopentyl glycol (NPG), 1,4-cyclohexane dimethanol (CHDM), butyl ethyl propane diol (BEPD), trimethylolpropane (TMP) or 1,6 hexanediol.

Suitably, the polyol component comprises one or more of the following: 1,4-cyclohexane dimethanol (CHDM), and trimethylolpropane (TMP).

The 2,2,4,4-tetraalkylcyclobutane-1,3-diol (TACD) can be represented by the general structure:

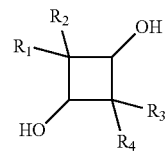

wherein R1, R2, R3, and R4 each independently represent an alkyl radical, for example, a lower alkyl radical having 1 to 8 carbon atoms; or 1 to 6 carbon atoms, or 1 to 5 carbon atoms, or 1 to 4 carbon atoms, or 1 to 3 carbon atoms, or 1 to 2 carbon atoms, or 1 carbon atom. The alkyl radicals may be linear, branched, or a combination of linear and branched alkyl radicals. Examples of TACD include 2,2,4,4-tetramethylcyclobutane-1,3-diol (TMCD), 2,2,4,4-tetraethylcyclobutane-1,3-diol (TECD), 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethyl-cyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol. Suitably, the TACD comprises 2,2,4,4-tetramethylcyclobutane-1,3-diol ("TMCD").

The 2,2,4,4-tetraalkylcyclobutane-1,3-diol (TACD) may be present as a proportion of the dry weight of the polyol component in an amount of from 10 to 80 wt %, suitably from 10 to 70 wt %, such as from 20 wt % to 60 wt %.

The polyol component may comprise TACD in combination with 2-methy-1,3 propanediol and/or cyclohexanedimethanol. Suitably, the polyol component comprises TMCD in combination with 2-methy-1,3 propanediol and/or cyclohexanedimethanol.

The polyol component may comprise TACD in combination with 2-methy-1,3 propanediol, cyclohexanedimethanol and/or trimethylolpropane. Suitably, the polyol component comprises TMCD in combination with 2-methy-1,3 propanediol, cyclohexanedimethanol and/or trimethylolpropane.

The polyacid component and/or the polyol component may comprise a sulfonated monomer. The sulfonated monomer may comprise a sulfonated diacid, such as a sulfonated aromatic diacid. The sulfonated monomer may comprise a salt thereof, such as an inorganic salt, for example a metal or ammonium salt. Examples of metal salts would include, for example sodium salts, lithium salts, potassium salts, magnesium salts, calcium salts, iron salts etc.

The polyacid component may comprise a sulfonated monomer. Alternatively, the polyacid component may be substantially free of sulfonated monomer.

Suitably, the sulfonated monomer may comprise a metal salt of 5-(sulfo)-isopthalic acid, such as the sodium salt thereof, referred to as 5-(sodiosulfo)-isophthalic acid, also referred to herein as 5-SSIPA.

Suitably, the sulfonated monomer comprises one or more of: 5-(sodiosulfo)-isophthalic acid, dimethyl 5-(sodiosulfo) isophalate, 5-(lithiosulfo)isophthalic acid, bis(2-hydroxyethyl)-5-(sodiosulfo)isophthalate.

Where the sulfonated monomer is a polyacid, the sulfonated monomer may be present as a proportion of the dry weight of the polyacid component in an amount of from 5 to 20 wt %, such as 7 to 15 wt %.

Where the sulfonated monomer is a polyol, the sulfonated monomer may be present as a proportion of the dry weight of the polyol component in an amount of from 5 to 20 wt %, such as 7 to 15 wt %.

Suitably, the polyacid component comprises one or more of the following: dimethyl terephthalate, isophthalic acid, hexahydrophthalic anhydride, cyclohexane 1,4-dicarboxylic acid, 5-(sodiosulfo)-isophthalic acid.

Suitably, the polyacid component comprises the aliphatic group-containing monomer and one or more of the following: dimethyl terephthalate, isophthalic acid, hexahydrophthalic anhydride, cyclohexane 1,4-dicarboxylic acid, 5-(sodiosulfo)-isophthalic acid.

Suitably, the functional monomer comprises maleic acid, maleic anhydride and/or fumaric acid.

The polyester material is suitably modified with acrylic by grafting an acrylic modification polymer onto the polyester material. This grafting may occur via free radical polymerization, such as by free radical polymerization onto ethylenic unsaturation on the polyester material.

Suitably, the acrylic modification polymer is formed from one or more acrylic monomers. Suitably, the acrylic modification polymer is grafted onto the polyester by polymerizing acrylic monomers in the presence of the polyester material to form the acrylic modified polyester resin.

Various acrylic monomers can be combined to prepare the acrylic modification polymer. Examples include methyl (meth)acrylate, ethyl(meth)acrylate, butyl (meth)acrylate, isobornyl (meth)acrylate, hydroxyethyl (meth)acrylate, 2-ethylhexyl(meth)acrylate, (meth)acrylic acid, nitriles such as (meth)acrylonitrile. Any other acrylic monomers known to those skilled in the art could also be used. The term "(meth) acrylate" and like terms are used conventionally and herein to refer to both methacrylate and acrylate. A particularly suitable acrylic modification polymer is formed with one or more of the following: methyl (meth)acrylate, ethyl (meth)acrylate, butyl (meth)acrylate, hydroxyethyl (meth)acrylate, (meth)acrylic acid, cyclohexyl (meth)acrylate, allyl (meth)acrylate, dimethylamino ethyl methacrylate. butylamino ethyl (meth)acrylate, HEMA phosphate (such as ethylene glycol methacrylate phosphate.

The acrylic monomers may comprise a ratio of methacrylate monomers to acrylate monomers of at least 1:1, such as at least 2:1 or at least 3:1 or at least 4:1, suitably at least 5:1. The acrylic monomers may be substantially free of acrylate monomers. By "methacrylate monomers" and "acrylate monomers" with regard to the ratio of these types of monomers in the acrylic monomers of the acrylic modification polymer, it is meant the total number of methacrylate monomers compared to the total number of acrylate monomers across all the types of acrylic monomer that form the acrylic modification polymer. For example, if the acrylic modification polymers is formed of methylmethacrylate, methyl acrylate and butyl acrylate, then the amount of methylmethacrylate compared to the combined amount of methyl acrylate and butyl acrylate would be at least 5:1.

The acrylic monomers may comprise a hydroxyl functional monomer, such as hydroxyethyl (meth)acrylate. Suitably, the hydroxyl functional monomer is present by dry weight of the acrylic modification polymer in an amount of from 5 to 40 wt %, such as from 5 to 30 wt % or from 10 to 20 wt %.

The acrylic modification polymer may also comprise an amount (0 to 30 w %, by dry weight of the acrylic modification polymer) of non acrylic monomers. Such non acrylic monomers may include other ethylenically unsaturated monomers, such as styrene, ethylene, propylene, vinyl toluene, butadiene, 1-octene or isoprene, vinyl esters such as vinyl acetate.

It has been identified that the acrylic modification polymer may suitably include meth acrylic acid or acrylic acid to impart acid functionality on the acrylic modification polymer. Suitably, the acid functionality on the acrylic modification polymer may be at least partially neutralised with a neutralisation agent.

Suitable neutralisation agents include ammonia or amine functional moieties: methyl ethanolamine, dimethylethanolamine (DMEA), trimethylamine, diethylene triamine.

Suitably, the acid functionality on the acrylic modification polymer may be at least 50% neutralised with a neutralisation agent. Suitably, the acid functionality on the acrylic modification polymer may be at least 75% neutralised with a neutralisation agent. Suitably, the acid functionality on the acrylic modification polymer may be at least 90% neutralised with a neutralisation agent.

Where the polyester material of the acrylic modified polyester resin comprises a sulfonated monomer, neutralisation of the acrylic modified polyester resin may not be required.

The polyester material may have any suitable number-average molecular weight (Mn). The polyester material may have an Mn from 1,000 Daltons (Da=g/mole) to 15,000 Da, suitably from 2,000 Da to 10,000 Da, such as from 3,000 Da to 8,000 Da, or even from 4,000 to 7,000 Da.

The number-average molecular weight may be measured by any suitable method. Techniques to measure the number-average molecular weight will be well known to a person skilled in the art. Suitably, and as reported herein, the Mn may be determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography". UV detector; 254 nm, solvent: unstabilised THF, retention time marker: toluene, sample concentration: 2 mg/ml).

The polyester material may have any suitable glass transition temperature (Tg). The polyester material may have a Tg from 0° C. to 100° C.

The glass transition temperature of the polyester material may be measured by any suitable method. Methods to measure Tg will be well known to a person skilled in the art. Suitably, and as reported herein, the Tg is measured according to ASTM D6604-00(2013) ("Standard Practice for Glass Transition Temperatures of Hydrocarbon Resins by Differential Scanning calorimetry". Heat-flux differential scanning calorimetry (DSC), sample pans: aluminium, reference: blank, calibration: indium and mercury, sample weight: 10 mg, heating rate: 20° C./min).

The polyester material may have any suitable gross hydroxyl value (OHV). The polyester material may have a gross OHV from 0 to 120 mg KOH/g. Suitably, the polyester material may have a gross OHV from 5 to 100 mg KOH/g, such as from 5 to 60 mg KOH/g, or from 5 to 80 mg KOH/g, such as 5 to 50 mg KOH/g or even from 7 to 40 mg KOH/g suitably from 10 to 30 mg KOH/g or 10 to 20 mg KOH/g. The gross OHV is suitably expressed on solids.

The gross hydroxyl value (OHV) of the polyester material may be measured by any suitable method. Methods to measure OHV will be well known to a person skilled in the art. Suitably, and as reported herein, the hydroxyl value is the number of mg of KOH equivalent to the hydroxyl groups in 1 g of material. In such a method, suitably, a sample of solid polyester (0.13 g) is weighed accurately into a conical flask and is dissolved, using light heating and stirring as appropriate, in 20 ml of tetrahydrofuran. 10 ml of 0.1M 4-(dimethylamino)pyridine in tetrahydrofuran (catalyst solution) and 5 ml of a 9 vol % solution of acetic anhydride in tetrahydrofuran (i.e. 90 ml acetic anhydride in 910 ml tetrahydrofuran; acetylating solution) are then added to the mixture. After 5 minutes, 10 ml of an 80 vol % solution of tetrahydrofuran (i.e. 4 volume parts tetrahydrofuran to 1 part distilled water; hydrolysis solution) is added. After 15 minutes, 10 ml tetrahydrofuran is added and the solution is titrated with 0.5M ethanolic potassium hydroxide (KOH). A blank sample is also run where the sample of solid polyester is omitted. The resulting hydroxyl number is expressed in units of mg KOH/g and is calculated using the following equation:

$$\text{Hydroxyl value} = \frac{(V_2 - V_1) \times \text{molarity of } KOH \text{ solution (M)} \times 56.1}{\text{weight of solid sample (g)}}$$

wherein $V_1$ is the titre of KOH solution (ml) of the polyester sample and $V_2$ is the titre of KOH solution (ml) of the blank sample. All values for gross hydroxyl value reported herein were measured in this way.

The polyester material may have any suitable acid value (AV). The polyester material may have an AV from 0 to 20 KOH/g. Suitably, the polyester may have a gross AV from 0 to 10 mg KOH/g, suitably less than 5 or even less than 3.

The AV is suitably expressed on solids.

The acid value (AV) of the polyester material may be measured by any suitable method. Methods to measure AN will be well known to a person skilled in the art. Suitably, and as reported herein, the AN is determined by titration with 0.1M methanolic potassium hydroxide (KOH) solution. In such a method, a sample of solid polyester (0.1 g) is weighed accurately into a conical flask and is dissolved, using light heating and stirring as appropriate, in 25 ml of dimethyl formamide containing phenolphthalein indicator. The solution is then cooled to room temperature and titrated with the 0.1M methanolic potassium hydroxide solution. The resulting acid number is expressed in units of mg KOH/g and is calculated using the following equation:

$$\text{Acid number} = \frac{\text{titre of } KOH \text{ solution (ml)} \times \text{molarity of } KOH \text{ solution (M)} \times 56.1}{\text{weight of solid sample (g)}}$$

All values for acid number reported herein were measured in this way.

The acrylic polyester resin, which may be an acrylic modified polyester resin, may have any suitable number-average molecular weight (Mn). The acrylic polyester resin, which may be an acrylic modified polyester resin, may have an Mn from 1,000 Daltons (Da=g/mole) to 15,000 Da, suitably from 2,000 Da to 12,000 Da, such as from 3,000 Da to 9,000 Da, or even from 3,500 to 8,000 Da.

The number-average molecular weight may be measured by any suitable method. Techniques to measure the number-average molecular weight will be well known to a person skilled in the art. Suitably, and as reported herein, the Mn may be determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography". UV detector; 254 nm, solvent: unstabilised THF, retention time marker: toluene, sample concentration: 2 mg/ml).

The Tg of the acrylic modification polymer (which is a measure of the Tg of the acrylic modification polymer, polymerized as a simple acrylic polymer, not in the presence of (or grafted onto) a polyester material) may be from 20 to 120° C. The Tg of the acrylic modification polymer can be calculated by the Fox equation as provided in "Coatings of Polymers and Plastics", Ryntz R. A. and Yaneff P. V, CRC Press, 4 Feb. 2003, page 134.

The glass transition temperature of the acrylic modification polymer may be measured by any suitable method. Methods to measure Tg will be well known to a person skilled in the art. Suitably, and as reported herein, the Tg is measured according to ASTM D6604-00(2013) ("Standard Practice for Glass Transition Temperatures of Hydrocarbon Resins by Differential Scanning calorimetry". Heat-flux differential scanning calorimetry (DSC), sample pans: aluminium, reference: blank, calibration: indium and mercury, sample weight: 10 mg, heating rate: 20° C./min).

The acrylic polyester resin, which may be an acrylic modified polyester resin, may have any suitable gross hydroxyl value (OHV). The acrylic modified polyester resin may have a gross OHV from 0 to 120 mg KOH/g. Suitably, the acrylic modified polyester resin may have a gross OHV from 5 to 100 mg KOH/g, such as from 10 to 60 mg KOH/g, or even from 10 to 50 mg KOH/g, such as from 10 to 30 mg KOH/g.

The gross OHV is suitably expressed on solids.

The acrylic polyester resin, which may be an acrylic modified polyester resin, may have any suitable acid value (AV). The acrylic modified polyester resin may have an AV from 10 to 80 KOH/g. Suitably, the acrylic modified polyester resin may have a gross AV from 10 to 60 mg KOH/g, such as from 10 to 50 mg KOH/g or from 15 to 40 mg KOH/g, or from 15 to 35 mg KOH/g.

The AV is suitably expressed on solids.

Suitably, the acrylic polyester resin, which may be an acrylic modified polyester resin, is formed from the polyester material and the acrylic modification polymer in a weight ratio of from 95 wt % to 55 wt % polyester material to from 45 wt % to 5 wt % acrylic modification polymer, such as from 90 wt % to 55 wt % polyester material to from 45 wt % to 10 wt % acrylic modification polymer, or from 90 wt % to 55 wt % polyester material to from 45 wt % to 10 wt % acrylic modification polymer, such as a weight ratio of from 90 wt % to 60 wt % polyester material to from 40 wt % to 10 wt % acrylic modification polymer, such as a weight ratio of from 85 wt % to 65 wt % polyester material to from 35 wt % to 15 wt % acrylic modification polymer or from 85 wt % to 75 wt % polyester material to from 25 wt % to 15 wt % acrylic modification polymer. For example, the acrylic modified polyester resin may be formed from the polyester material and the acrylic modification polymer in a weight ratio of 80 wt % polyester material to 20 wt % acrylic modification polymer.

The acrylic polyester resin, which may be an acrylic modified polyester resin, may be present in the aqueous coating composition in an amount of from 50 to 99 wt % (based on dry weight of the aqueous coating composition). Suitably, the acrylic polyester resin may be present in the aqueous coating composition in an amount of from 60 to 95 wt % (based on dry weight of the aqueous coating composition).

The polyester material according to the present invention may be prepared in the presence of an esterification catalyst. Suitably, the esterification catalyst may be chosen to promote the reaction of components by esterification and/or trans-esterification. Suitable examples of esterification catalysts for use in the preparation of the polyester material include, but are not limited to the following: metal compounds such as stannous octoate; stannous chloride; butyl stannoic acid (hydroxy butyl tin oxide); monobutyl tin tris (2-ethylhexanoate); chloro butyl tin dihydroxide; dibutyl tin oxide; tetra-n-propyl titanate; tetra-n-butyl titanate; zinc acetate; acid compounds such as phosphoric acid; para-toluene sulphonic acid; dodecyl benzene sulphonic acid (DDBSA), tetra alkyl zirconium materials, antimony trioxide, germanium dioxide, bismuth octoate and combinations thereof. The esterification catalyst may be dodecyl benzene sulphonic acid (DDBSA). The esterification catalyst may be dibutyl tin oxide or stannous octoate, such as stannous octoate.

The esterification catalyst, when present, may be used in amounts from 0.001 to 1% by weight on total polymer components, suitably from 0.01 to 0.2%, such as from 0.025 to 0.2% by weight on total polymer components.

The term "aliphatic" herein means a hydrocarbon moiety that may be straight chain or branched and may be completely saturated, or contain one or more units of unsaturation, but which is not aromatic. The term "unsaturated" means a moiety that has one or more double and/or triple bonds. The term "aliphatic" is therefore intended to encompass alkyl, alkenyl or alkynyl groups. An aliphatic group may be interrupted by a heteroatom. Suitably, the heteroatom is selected from one or more of nitrogen, oxygen and sulphur.

"Aliphatic" herein includes alicyclic group which is a saturated or partially unsaturated cyclic aliphatic monocyclic or polycyclic (including fused, bridging and spiro-fused) ring system which has from 3 to 20 carbon atoms, that is an alicyclic group with 3, 4, 5, 6, 7, 8, 9, 10, 11, 12, 13, 14, 15, 16, 17, 18, 19 or 20 carbon atoms. An alicyclic group may comprise from 3 to 15, such as from 3 to 12, or from 3 to 10, or from 3 to 8 carbon atoms, for example from 3 to 6 carbons atoms. The term "alicyclic" encompasses cycloalkyl, cycloalkenyl and cycloalkynyl groups. It will be appreciated that the alicyclic group may comprise an alicyclic ring bearing one or more linking or non-linking alkyl substituents, such as —$CH_2$-cyclohexyl. Specifically, examples of the $C_{3-20}$ cycloalkyl group include cyclopropyl, cyclobutyl, cyclopentyl, cyclohexyl, cycloheptyl, adamantly, isobornyl and cyclooctyl.

The term "alk" or "alkyl", as used herein unless otherwise defined, relates to saturated hydrocarbon radicals being straight, branched, cyclic or polycyclic moieties or combinations thereof and contain 1 to 20 carbon atoms, suitably 1 to 10 carbon atoms, more suitably 1 to 8 carbon atoms, still more suitably 1 to 6 carbon atoms, yet more suitably 1 to 4 carbon atoms. These radicals may be optionally substituted with a chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or heteroatom, wherein $R^{19}$ to $R^{27}$ each independently represent hydrogen, aryl or alkyl, and/or be interrupted by oxygen or sulphur atoms, or by silano or dialkylsiloxane groups. Examples of such radicals may be independently selected from methyl, ethyl, n-propyl, isopropyl, n-butyl, isobutyl, sec-butyl, tert-butyl, 2-methylbutyl, pentyl, iso-amyl, hexyl, cyclohexyl, 3-methylpentyl, octyl and the like. The term "alkylene", as used herein, relates to a bivalent radical alkyl group as defined above. For example, an alkyl group such as methyl which would be represented as —$CH_3$, becomes methylene, —$CH_2$—, when represented as an alkylene. Other alkylene groups should be understood accordingly.

The term "alkenyl", as used herein, relates to hydrocarbon radicals having a double bond, suitably up to 4, double bonds, being straight, branched, cyclic or polycyclic moieties or combinations thereof and containing from 2 to 18 carbon atoms, suitably 2 to 10 carbon atoms, more suitably from 2 to 8 carbon atoms, still more suitably 2 to 6 carbon atoms, yet more suitably 2 to 4 carbon atoms. These radicals may be optionally substituted with a hydroxyl, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or alkyl, and/or be interrupted by oxygen or sulphur atoms, or by silano or dialkylsiloxane groups. Examples of such radicals may be independently selected from alkenyl groups include vinyl, allyl, isopropenyl, pentenyl, hexenyl, heptenyl, cyclopropenyl, cyclobutenyl, cyclopentenyl, cyclohexenyl, 1-propenyl, 2-butenyl, 2-methyl-2-butenyl, isoprenyl, farnesyl, geranyl, geranylgeranyl and the like. The term "alkenylene", as used herein, relates to a bivalent radical alkenyl group as defined above. For example, an alkenyl group such as ethenyl which would be represented as —CH═CH2, becomes ethenylene, —CH═CH—, when represented as an alkenylene. Other alkenylene groups should be understood accordingly.

The term "alkynyl", as used herein, relates to hydrocarbon radicals having a triple bond, suitably up to 4, triple bonds, being straight, branched, cyclic or polycyclic moieties or combinations thereof and having from 2 to 18 carbon atoms, suitably 2 to 10 carbon atoms, more suitably from 2 to 8 carbon atoms, still more suitably from 2 to 6 carbon atoms, yet more suitably 2 to 4 carbon atoms. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or lower alkyl, and/or be interrupted by oxygen or sulphur atoms, or by silano or dialkylsiloxane groups. Examples of such radicals may be independently selected from alkynyl radicals include ethynyl, propynyl, propargyl, butynyl, pentynyl, hexynyl and the like. The term "alkynylene", as used herein, relates to a bivalent radical alkynyl group as defined above. For example, an alkynyl group such as ethynyl which would be represented as —CCH, becomes ethynylene, —CC—, when represented as an alkynylene. Other alkynylene groups should be understood accordingly.

The term "aryl" as used herein, relates to an organic radical derived from an aromatic hydrocarbon by removal of one hydrogen, and includes any monocyclic, bicyclic or polycyclic carbon ring of up to 7 members in each ring, wherein at least one ring is aromatic. These radicals may optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or lower alkyl, and/or be interrupted by oxygen or sulphur atoms, or by silano or dialkylsilcon groups. Examples of such radicals may be independently selected from phenyl, p-tolyl, 4-methoxyphenyl, 4-(tert-butoxy)phenyl, 3-methyl-4-methoxyphenyl, 4-fluorophenyl, 4-chlorophenyl, 3-nitrophenyl, 3-aminophenyl, 3-acetamidophenyl, 4-acetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4-hydroxyphenyl, 3-methyl-4-hydroxyphenyl, 1-naphthyl, 2-naphthyl, 3-amino-1-naphthyl, 2-methyl-3-amino-1-naphthyl, 6-amino-2-naphthyl, 4,6-dimethoxy-2-naphthyl, tetrahydronaphthyl, indanyl, biphenyl, phenanthryl, anthryl or acenaphthyl and the like. The term "arylene", as used herein, relates to a bivalent radical aryl group as defined above. For example, an aryl group such as phenyl which would be represented as -Ph, becomes phenylene, -Ph-, when represented as an arylene. Other arylene groups should be understood accordingly.

For the avoidance of doubt, the reference to alkyl, alkenyl, alkynyl, aryl or aralkyl in composite groups herein should be interpreted accordingly, for example the reference to alkyl in aminoalkyl or alk in alkoxyl should be interpreted as alk or alkyl above etc.

The aqueous coating compositions of the present invention comprise a crosslinking material. The crosslinking material may be operable to crosslink the acrylic modified polyester resin. The crosslinking material may be a single molecule, a dimer, an oligomer, a (co)polymer or a mixture thereof. The crosslinking material may be a dimer or trimer.

The crosslinking material may be operable to crosslink the acrylic polyester resin.

The crosslinking material may comprise any suitable crosslinking material. Suitable crosslinking materials will be well known to the person skilled in the art. Suitable crosslinking materials include, but are not limited to the following: melamine; benzoguanamine, phenolic resins (or phenol-formaldehyde resins); aminoplast resins (or triazine-formaldehyde resins); amino resins; epoxy resins; isocyanate resins; beta-hydroxy (alkyl) amide resins; alkylated carbamate resins; polyacids; anhydrides; organometallic acid-functional materials; polyamines; polyamides and combinations thereof.

Non-limiting examples of phenolic resins are those formed from the reaction of a phenol with an aldehyde or a ketone, suitably from the reaction of a phenol with an aldehyde, such as from the reaction of a phenol with formaldehyde or acetaldehyde, or even from the reaction of a phenol with formaldehyde. Non-limiting examples of phenols which may be used to form phenolic resins are phenol, butyl phenol, xylenol and cresol. General preparation of phenolic resins is described in "The Chemistry and Application of Phenolic Resins or Phenoplasts", Vol V, Part I, edited by Dr Oldring; John Wiley and Sons/Cita Technology Limited, London, 1997. Suitably, the phenolic resins are of the resol type. By "resol type" we mean resins formed in the presence of a basic (alkaline) catalyst and optionally an excess of formaldehyde. Suitable examples of commercially available phenolic resins include, but are not limited to those sold under the trade name PHENODUR® commercially available from Cytec Industries, such as PHENODUR EK-827, PHENODUR VPR1785, PHENODUR PR 515, PHENODUR PR516, PHENODUR PR 517, PHENODUR PR 285, PHENODUR PR612 or PHENODUR PH2024; resins sold under the trade name BAKELITE® commercially available from Momentive, such as BAKELITE 6582 LB, BAKELITE 6535, BAKELITE PF9989 or BAKELITE PF6581; SFC 112 commercially available from Schenectady; DUREZ® 33356 commercially available from SHHPP; ARALINK® 40-852 commercially available from Bitrez; or combinations thereof.

The aqueous coating composition may be substantially formaldehyde free, or suitably essentially formaldehyde free, or suitably completely formaldehyde free. By "substantially free" we mean to refer to aqueous coating compositions containing less than 1000 parts per million (ppm) of any of the compounds or derivatives thereof mentioned above. By "essentially free" we mean to refer to aqueous coating compositions containing less than 100 ppm of any of the compounds or derivatives thereof mentioned above. By "completely free" we mean to refer to aqueous coating compositions containing less than 20 parts per billion (ppb) of any of the compounds or derivatives thereof.

Non limiting examples of isocyanate resins include, but are not limited to the following: isophorone diisocyanate (IPDI), such as those sold under the trade name DESMO- DUR® commercially available from Bayer, for example DESMODUR VP-LS 2078/2 or DESMODUR PL 340 or those sold under the trade name VESTANAT® commercially available from Evonik, for example VESTANANT B 1370, VESTANAT B 118 6A or VESTANAT B 1358 A; blocked aliphatic polyisocyanate based on hexamethylene diisocyanate (HDI), such as those sold under the trade name DESMODUR® commercially available from Bayer, for example DESMODUR BL3370 or DESMODUR BL 3175 SN, those sold under the trade name DURANATE® commercially available from Asahi KASEI, for example DURANATE MF-K60X, those sold under the trade name TOLONATE® commercially available from Perstorp, for example TOLONATE D2 or those sold under the trade name TRIXENE® commercially available from Baxenden, for example TRIXENE-BI-7984 or TRIXENE 7981; or combinations thereof.

The crosslinking material may contain nitrogen. The crosslinking material may be in the form of an amine or amide material. The crosslinking material may comprise a hydroxyl substituted amine or amide material.

Suitably, the crosslinking material may comprise a hydroxyalkylamide material, such as a β-hydroxyalkylamide material.

The crosslinking material may contain a terminal chemical group as shown in Formula I.

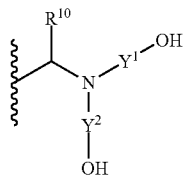

Formula I wherein $R^{10}$ represents an electron withdrawing group, such as (=O); and $Y^1$ and $Y^2$ each, independently, represents a $C_1$ to $C_3$ alkylene group.

The terminal chemical group of Formula I may be connected to a further chemical structure, not shown. Additionally or alternatively, the chemical group of formula I may be suspended from a carrier substrate, such as a silica carrier substrate, for example.

The crosslinking material may contain a plurality of terminal chemical groups as shown in Formula I. For example, the crosslinking material may contain 2, 3 or 4 terminal chemical groups as shown in Formula I.

The crosslinking material may comprise a moiety according to Formula II:

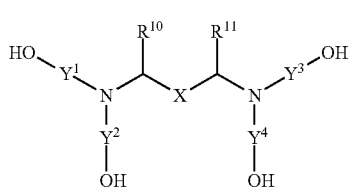

Formula II wherein $R^{10}$ and $R^{11}$ each, independently, represent an electron withdrawing group, such as (=O);

$Y^1$, $Y^2$, $Y^3$ and $Y^4$ each, independently, represent a $C_1$ to $C_3$ alkylene group; and X represents a $C_2$ to $C_6$ alkylene group.

Suitably, each of $R^{10}$ and $R^{11}$ represents a (=O) group.

Suitably, each of $Y^1$, $Y^2$, $Y^3$ and $Y^4$ represent an ethylene group.

Suitably, X represents a butylene group.

Accordingly, the crosslinking material may comprise a material of formula III:

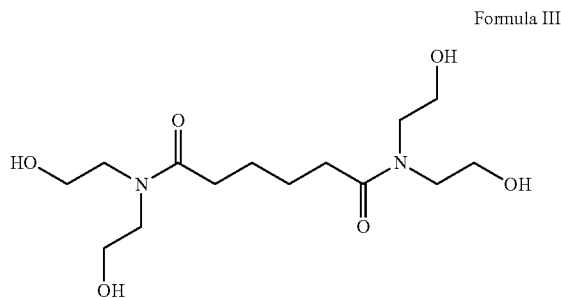 [SMILES: O=C(CCCCC(=O)N(CCO)CCO)N(CCO)CCO]

Formula III

The crosslinking material may comprise a commercially available β-hydroxyalkylamide crosslinking, such as, for example, PRIMID XL-552 (available from Rohm and Haas); PRIMID QM-1260 (available from EMS Chemie); and N,N,N',N'-tetrakis(2-hydroxypropyl)adipamide.

The crosslinking material may be in the form of a urea material. The crosslinking material may comprise a hydroxyl substituted urea material.

Suitably, the crosslinking material may comprise a hydroxy functional alkyl polyurea material.

The crosslinking material may contain a terminal chemical group as shown in Formula IV.

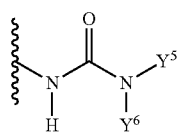

Formula IV wherein $Y^5$ and $Y^6$ each, independently, represent hydrogen, an alkyl or a hydroxy functional alkyl having two or more carbon atoms and at least one of $Y^5$ and $Y^6$ is a hydroxyl functional alkyl having two or more carbon atoms.

The $Y^5$ and $Y^6$ groups may exclude ether linkages.

The terminal chemical group of Formula IV may be connected to a further chemical structure, not shown. Additionally or alternatively, the chemical group of Formula IV may be suspended from a carrier substrate, such as a silica carrier substrate, for example.

The crosslinking material may contain a plurality of terminal chemical groups as shown in Formula IV. For example, the crosslinking material may contain 2 to 6 terminal chemical groups as shown in Formula IV, such as 2, 3 or 4 terminal chemical groups as shown in Formula IV.

The crosslinking material may comprise a moiety according to Formula V:

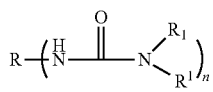

Formula V wherein R comprises the residue of an isocyanurate, biuret, allophonate, glycoluril, benzoguanamine, and/or polyetheramine;
each $R_1$ is independently a hydrogen, an alkyl or a hydroxy functional alkyl having 2 or more carbons and at least one $R_1$ is a hydroxy functional alkyl having 2 or more carbons; and n is 2-6.

Suitably, the $R_1$ group may exclude ether linkages.

The crosslinking material may comprise a moiety according to Formula VI:

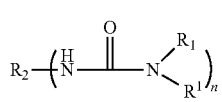

Formula VI wherein $R_2$ comprises a substituted or unsubstituted $C_1$ to $C_{36}$ alkyl group, an aromatic group, or the residue of an isocyanurate, biuret, allophonate, glycoluril, benzoguanamine, and/or polyetheramine;
each $R_1$ is independently a hydrogen, an alkyl group having 1 or more carbons, or a hydroxy functional alkyl having 2 or more carbons and at least one $R_1$ is a hydroxy functional alkyl having 2 or more carbons;
and n is 2-6.

Suitably, the $R_1$ group may exclude ether linkages.

R and $R_2$ may comprise the residue of an isocyanurate, biuret, allophonate, glycoluril, benzoguanamine and/or polyetheramine. An isocyanurate will be understood as referring to a compound having three isocyanate groups, typically in ring form, and is sometimes referred to as a trimer. This can include compounds having one or more isocyanurate moieties. Isocyanurates can be purchased from Covestro and Vencore X Chemical. Suitable commercially available isocyanurates include those sold under the trade name DESMODUR such as, for example, DESMODUR N 3300A, DESMODUR N3800, DESMODUR N3400, DESMODUR N3600, DESMODUR N3900 and DESMODUR RC (commercially available from Covestro), those sold under the trade name VESTANANT such as, for example, VESTANAT T1890/100 (commercially available from Evonik) and those sold under the trade name EASAQUA such as, for example, EASAQUA WT 2102, EASAQUA X D 401, EASAQUA M 501, EASAQUA X D 803, EASAQUA M 502 and EASAQUA X L 600 (commercially available from Vencore X Chemical). A particularly suitable hydroxy functional alkyl polyurea formed from an isocyanurate is shown in Formula VII:

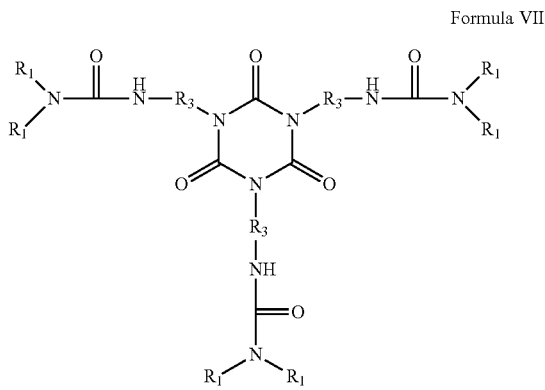

Formula VII wherein $R_1$ is as described above;
and each $R_3$ independently comprises an alkyl, aryl, alkylaryl, arylalkyl, alicyclic, and/or polyetheralkyl group.

A particularly suitable hydroxy functional alkyl polyurea formed from a bis-isocyanurate is shown below in Formula VIII:

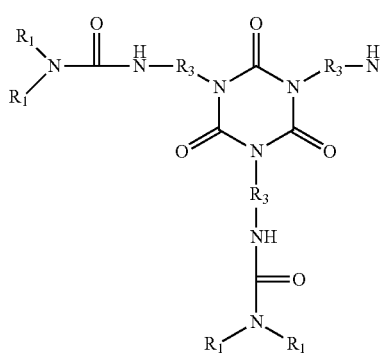

Formula VIII wherein $R_1$ and $R_3$ are as described above.

A biuret will be understood as referring to a compound that results upon the condensation of two molecules of urea, and is sometimes referred to as a carbamylurea. Biurets are commercial available from Vencore X Chemical and Covestro as, for example, DESMODUR N-75, DESMODUR N-100, and DESMODUR N-3200, HDB 75B, HDB 75M, HDB 75MX, HDB-LV. A particularly suitable hydroxy functional alkyl polyurea formed from a biuret is shown below in Formula IX:

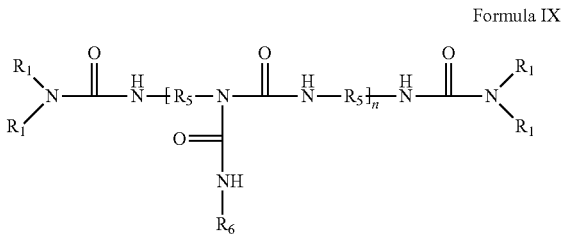

Formula IX wherein $R_1$ is as described above;
each $R_5$ independently comprises an alkyl, aryl, alkylaryl, arylalkyl, alicyclic, and/or polyetheralkyl group;

and $R_6$ comprises H or an alkyl group.

Uretidione is a dimer of diisocyanate, examples of which include DESMODUR N-3400 polyisocyanate, a blend of the trimer and uretidione of HDI:

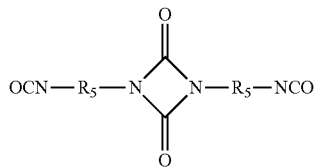

wherein each $R_5$ independently comprises an alkyl, aryl, alkylaryl, arylalkyl, alicyclic, and/or polyetheralkyl group.

An allophonate will be understood as referring to a compound made from urethane and isocyanate. A method for making an allophonate is described at Surface Coating, Vol 1, Raw material and their usage, Landon New York, Chapman and Hall, Page 106. The reaction is generally depicted below in scheme I:

Scheme I

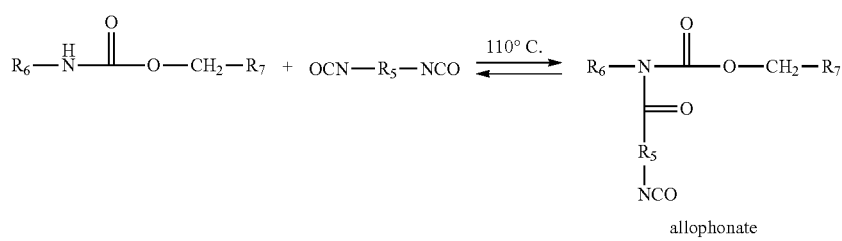

allophonate wherein $R_5$ and $R_6$ are each as described above; and $R_7$ independently comprises residues of a primary alcohol which is reacted with isocyanate.

A glycoluril will be understood as referring to a compound composed of two cyclic urea groups joined across the same two-carbon chain, a suitable examples of which includes the below:

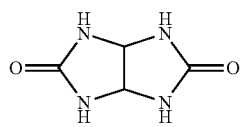

Glycoluril is widely commercially available, such as from Sigma-Aldrich. Benzoguanamine is also known as 6-phenyl-1,3,5-triazine-2,4-diamine and is commercially available from The Chemical Company, Jamestown, R.I.

A polyether amine will be understood as referring to a compound having one or more amine groups attached to a polyether backbone such as one characterized by propylene oxide, ethylene oxide, or mixed propylene oxide and ethylene oxide repeating units in their respective structures, such as, for example, one of the Jeffamine series products. Examples of such polyetheramines include aminated propoxylated pentaerythritols, such as JEFFAMINE XTJ-616, and those represented by Formulas (X) through (VI).

According to Formula (IV) the polyether amine may comprise:

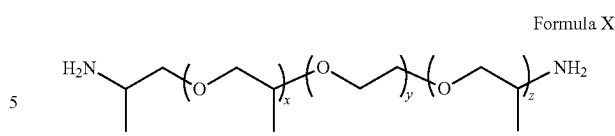

Formula X wherein y=0-39, x+z=1-68.

Suitable amine-containing compounds represented by Formula X include, but are not limited to, amine-terminated polyethylene glycol such as those commercially available from Huntsman Corporation in its JEFFAMINE ED series, such as JEFFAMINE HK-511, JEFFAMINE ED-600, JEFFAMINE ED-900 and JEFFAMINE ED-2003, and amine-terminated polypropylene glycol such as in its JEFFAMINE D series, such as JEFFAMINE D-230, JEFFAMINE D-400, JEFFAMINE D-2000 and JEFFAMINE D-4000.

According to Formula XI the polyetheramine may comprise:

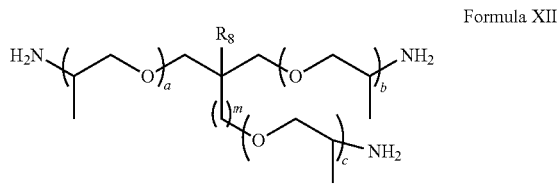

Formula XI wherein each p independently is 2 or 3.

Suitable amine-containing compounds represented by Formula XI include, but are not limited to, amine-terminated polyethylene glycol based diamines, such as Huntsman Corporation's JEFFAMINE EDR series, such as JEFFAMINE EDR-148 and JEFFAMINE EDR-176.

According to Formula XII the polyetheramine may comprise:

Formula XII wherein $R_8$ is H or $C_2H_5$, m=0 or 1, a+b+c=5-85.

Suitable amine-containing compounds represented by Formula (VI) include, but are not limited to, amine-terminated propoxylated trimethylolpropane or glycerol, such as Huntsman Corporation's Jeffamine T series, such as JEFFAMINE T-403, JEFFAMINE T-3000 and JEFFAMINE T-5000.

Particularly suitable are di- and tri-amines, such as 4,7,10-trioxa-1,13-tridecanediamine, JEFFAMINE D400, JEFFAMINE D4000, JEFFAMINE D2000, JEFFAMINE T403.

In all cases, $R_2$ may be substituted or unsubstituted. $R_2$, as noted above, may also comprise a substituted or unsubstituted $C_1$ to $C_{36}$ alkyl group and/or an aromatic group. For example, the alkyl group may have two to ten carbon atoms such as six carbon atoms. The alkyl group may derive from an isocyanate, such as a diisocyanate. Suitable examples include isophorone diisocyanate and hexamethylene isocyanate. The aromatic group may derive from an aromatic ring containing isocyanate, suitable examples of which include methylene diphenyl diisocyanate, toluene diisocyanate and tetramethylxylylene diisocyanate.

Certain hydroxy functional alkyl polyureas of, and/or used according to, the invention may be made by reacting an isocyanate-containing compound with amino alcohol. Any isocyanate-containing compound having at least two isocyanate groups can be used, such as any of those described above. It will be appreciated that the "R" or "$R_2$" group will reflect the isocyanate-containing compound selected.

Similarly, any amino alcohol having two or more carbon atoms can be used, and the "$R_1$" group will reflect the amino alcohol selected. The amino alcohol can have one, two or more hydroxyl functional groups. One or more amino alcohols can be used, which will result in different $R_1$ groups being present on the polyurea. $R_1$ can also be hydrogen or an alkyl group. Suitable amino alcohols include monoethanol amine, diethanol amine and diisopropyl amine.

The hydroxyl functional alkyl polyureas can be made by reacting amino alcohol with an isocyanate-containing compound in an organic polar solvent, such as alcohol or water. The reaction temperate may be kept below 35° C. The equivalent ratio of amine to isocyanate may be 2-1:1-2, such as 1:1.

The hydroxy functional alkyl polyureas of, and/or used according to, the invention may be made by alternative methods as well. For example, amino alcohols can react with carbonate to form hydroxylalkyl carbamate, and hydroxylalkyl carbamate can further react with amines to form hydroxy functional alkyl polyureas.

The number-average molecular weight (Mn) of the hydroxy functional alkyl polyurea may be 100 or greater, such as 350 or greater or 1,000 or greater, and/or can be 6,000 or lower, such as 3,000 or lower, or 2,000 or lower. Mn means the theoretical value as determined by Gel Permeation Chromatography using Waters 2695 separation module with a Waters 410 differential refractometer (RI detector) and polystyrene standards. The range of molecular weights of the polystyrene standards for this method is from approximately 800 to 900,000 g/mol. In determining Mn according to the invention, tetrahydrofuran (THF) was used as the eluent at a flow rate of 1 ml min-1, and two PL Gel Mixed C columns were used for separation.

The hydroxyl functional alkyl polyurea material may be made by reacting a dialkanol amine with hexamethylene diisocyanate (HDI) trimer and/or isophorone diisocyanate (IDPI) trimer, suitably hexamethylene diisocyanate (HDI) trimer. The hydroxyl functional alkyl polyurea material may be made by reacting diethanolamine with hexamethylene diisocyanate (HDI) trimer and/or isophorone diisocyanate (IDPI) trimer, suitably hexamethylene diisocyanate (HDI) trimer. The hydroxyl functional alkyl polyurea material may be made by reacting diisopropanolamine with hexamethylene diisocyanate (HDI) trimer and/or isophorone diisocyanate (IDPI) trimer, suitably hexamethylene diisocyanate (HDI) trimer.

The crosslinking material may be present in the aqueous coating compositions of the present invention is any suitable amount. The aqueous coating compositions may comprise from 0.5 to 40 wt %, suitably from 1 to 30 wt %, such as from 5 to 20 wt % of the crosslinking material based on the total solid weight of the aqueous coating composition.

The crosslinking material may comprise one or more of a phenolic resin, benzoguanamine or melamine. Suitably, the crosslinking material comprises benzoguanamine.

The aqueous coating composition may comprise a catalyst. Suitable examples of catalysts include, but are not limited to the following: metal compounds such as stannous octoate; stannous chloride; butyl stannoic acid (hydroxy butyl tin oxide); monobutyl tin tris (2-ethylhexanoate); chloro butyl tin dihydroxide; tetra-n-propyl titanate; tetra-n-butyl titanate; zinc acetate; acid compounds such as phosphoric acid; para-toluene sulphonic acid; dodecyl benzene sulphonic acid (DDBSA) such as blocked DDBSA, tetra alkyl zirconium materials, antimony trioxide, germanium dioxide and combinations thereof. The catalyst may comprise dodecyl benzene sulphonic acid (DDBSA), such as blocked DDBSA.

The catalyst may be present in the aqueous coating composition in amounts from 0.001 to 1% by dry weight of the aqueous coating composition, suitably from 0.01 to 0.7%, such as from 0.025 to 0.5% by dry weight of the aqueous coating composition.

The aqueous coating compositions according to the present invention may be substantially free of bisphenol A (BPA) and derivatives thereof. The aqueous coating compositions according to the present invention may be essentially free or may be completely free of bisphenol A (BPA) and derivatives thereof. Derivatives of bisphenol A include, for example, bisphenol A diglycidyl ether (BADGE).

The aqueous coating compositions according to the present invention may be substantially free of bisphenol F (BPF) and derivatives thereof. The aqueous coating compositions according to the present invention may be essentially free or may be completely free of bisphenol F (BPF) and derivatives thereof. Derivatives of bisphenol F include, for example, bisphenol F diglycidyl ether (BPFG).

The aqueous coating compositions according to the present invention may be substantially free of styrene. The aqueous coating compositions according to the present invention may be essentially free or may be completely free of styrene.

The compounds or derivatives thereof mentioned above, i.e. BPA, BPF and derivatives thereof, may not be added to the composition intentionally but may be present in trace amounts because of unavoidable contamination from the environment. By "substantially free" we mean to refer to coating compositions containing less than 1000 parts per million (ppm) of any of the compounds or derivatives thereof mentioned above. By "essentially free" we mean to refer to coating compositions containing less than 100 ppm of any of the compounds or derivatives thereof mentioned above. By "completely free" we mean to refer to aqueous coating compositions containing less than 20 parts per billion (ppb) of any of the compounds or derivatives thereof.

The aqueous coating composition may comprise an adhesion promoter. The adhesion promoter may comprise and acidic polyester.

The acidic polyester may be added in an amount of from about 0.1 to 15 wt % (based on the dry weight of the aqueous coatings ingredients), more suitably from about 2 to 12 wt % (based on the dry weight of the aqueous coatings ingredients). In one embodiment, the acidic polyester may be present in an amount of from about 4 to 10 wt % (based on the dry weight of the aqueous coatings ingredients).

The acidic polyester may comprise a reaction product of one or more polyester with a phosphorus acid, such as phosphoric acid. In this context, the polyester may have an Mn of 2000 to 10,000. The polyester may have a hydroxyl number of 20 to 75. The polyester may have an acid value of 15 to 25.

Suitably, the acidic polyester comprises a solution of a copolymer with acidic groups having an acid value from 15 up to 100 mgKOH/g. Examples of commercially available suitable acidic polyesters include are BYK-4510 (commercially available from Byk Altana) or PLUSOLIT H-PD (commercially available from Mader) or BORCHI GEN HMP-F or BORCHI GEN HE (commercially available from OMG Borchers).

In a suitable embodiment, the acidic polyester may generally comprise the reaction product of:
(a) a polyester having an Mn of 2000 to 10,000, a hydroxyl number of 20 to 75, and an acid value of 15 to 25; the polyester being a polycondensate of:
  (i) a polyol component comprising a mixture of diols and triols,
  (ii) a polyacid component comprising an alpha, beta-ethylenically unsaturated polycarboxylic acid,
and
(b) a phosphorus acid.

Further suitable examples of acidic polyesters are given in WO 2012/162301, the contents of which are entirely incorporated herein by reference.

The aqueous coating compositions of the present invention may comprise a further resin material. Suitable further resin materials will be well known to a person skilled in the art. Suitable examples of further resin materials include, but are not limited to the following: polyester resins; acrylic resins; polyvinyl chloride (PVC) resins; alkyd resins; polyurethane resins; polysiloxane resins; epoxy resins or combinations thereof. Suitably, the further resin material may comprise polyvinyl chloride (PVC) resins.

The aqueous coating compositions of the present invention may comprise other optional materials well known in the art of formulating coatings, such as colorants, plasticizers, abrasion-resistant particles, anti-oxidants, hindered amine light stabilizers, UV light absorbers and stabilizers, surfactants, flow control agents, thixotropic agents, fillers, organic co-solvents, reactive diluents, catalysts, grind vehicles, lubricants, waxes and other customary auxiliaries. It might be particularly desired to use some quantity of non-polymerisable surfactant in conjunction with the polymerisable surfactant in the preparation of the latex and/or in a coating comprising the latex.

As used herein, the term "colorant" means any substance that imparts colour and/or other opacity and/or other visual effect to the composition. The colorant can be added to the aqueous coating in any suitable form, such as discrete particles, dispersions, solutions and/or flakes. A single colorant or a mixture of two or more colorants can be used in the aqueous coatings of the present invention. Suitable colorants are listed in U.S. Pat. No. 8,614,286, column 7, line 2 through column 8, line 65, which is incorporated by reference herein. Particularly suitable for packaging coatings are those approved for food contact, such as titanium dioxide; iron oxides, such as black iron oxide; aluminium paste; aluminium powder such as aluminium flake; carbon black; ultramarine blue; phthalocyanines, such as phthalocyanine blue and phthalocyanine green; chromium oxides, such as chromium green oxide; graphite fibrils; ferried yellow; quindo red; and combinations thereof, and those listed in Article 178.3297 of the Code of Federal Regulations, which is incorporated by reference herein.

The aqueous coating compositions may comprise aluminium paste, aluminium powder, such as aluminium flake, or a combination thereof. Suitably, the aqueous coating compositions may comprise aluminium paste.

The colorant, when present, may be used in the aqueous coating composition in any suitable amount. The colorant, when present, may be used in the aqueous coating composition in amounts up to 90 wt %, such as up to 50 wt %, or even up to 10 wt % based on the total solid weight of the aqueous coating composition.

Suitable lubricants will be well known to the person skilled in the art. Suitable examples of lubricants include, but are not limited to the following: carnuba wax, PTFE, polypropylene and polyethylene type lubricants. The lubricant, when present, may be used in the aqueous coating composition in amounts of at least 0.01 wt % based on the total solid weight of the aqueous coating composition, suitably 0.5 to 2 wt %.

Surfactants may optionally be added to the aqueous coating composition in order to aid in flow and wetting of the substrate. Suitable surfactants will be well known to the person skilled in the art. Suitably the surfactant, when present, is chosen to be compatible with food and/or beverage container applications. Suitable surfactants include, but are not limited to the following: alkyl sulphates (e.g., sodium lauryl sulphate); ether sulphates; phosphate esters; sulphonates; and their various alkali, ammonium, amine salts; aliphatic alcohol ethoxylates; alkyl phenol ethoxylates (e.g. nonyl phenol polyether); salts and/or combinations thereof. The surfactants, when present, may be present in amounts from 0.01 wt % to 10 wt %, suitably from 0.01 to 5 wt %, such as from 0.01 to 2 wt % based on the total solid weight of the aqueous coating composition.

The aqueous coating compositions of the present invention may be substantially free, may be essentially free or may be completely free of dialkyltin compounds, including oxides or other derivatives thereof. Examples of dialkyltin compounds include, but are not limited to the following: dibutyltindilaurate (DBTDL); dioctyltindilaurate; dimethyltin oxide; diethyltin oxide; dipropyltin oxide; dibutyltin oxide (DBTO); dioctyltinoxide (DOTO) or combinations thereof. By "substantially free" we mean to refer to coating compositions containing less than 1000 parts per million (ppm) of any of the compounds or derivatives thereof mentioned above. By "essentially free" we mean to refer to coating compositions containing less than 100 ppm of any of the compounds or derivatives thereof mentioned above. By "completely free" we mean to refer to coating compositions containing less than 20 parts per billion (ppb) of any of the compounds or derivatives thereof.

The coating composition of the present invention may have any suitable solids content. The coating composition may have a solids content of from 10 to 60% by weight of the coating composition, such as from 15 to 50 wt % or suitably from 20 to 40 wt %.

The coating composition of the present invention may be applied to any suitable substrate. The coating composition may be applied to a metal substrate. Examples of suitable metal substrates include, but are not limited to, food and/or beverage packaging, components used to fabricate such packaging or monobloc aerosol cans and/or tubes. Suitably, the food and/or beverage packaging may be a can. Examples of cans include, but are not limited to one or more of the following, two-piece cans, three-piece cans and the like.

Suitable examples of monobloc aerosol cans and/or tubes include, but are not limited to, deodorant and hair spray containers. Monobloc aerosol cans and/or tubes may be aluminium monobloc aerosol cans and/or tubes.

The coating compositions may be applied to food and/or beverage packaging or components used to fabricate such packaging.

The coating compositions may be applied to monobloc aerosol cans and/or tubes.

The application of various pre-treatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food or beverage, for example, can lead to corrosion of a metal container, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain powder coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

Accordingly, the present invention is further directed to a package coated at least in part with any of the coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage container or bakeware in which a consumer might make and/or store food; such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is metal can. The term "metal can" includes any type of metal can, container or any type of receptacle or portion thereof that is sealed by the food and/or beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating can be applied to the interior and/or the exterior of the package. The coating could also be applied as a rim coat to the bottom of the can. The rim coat functions to reduce friction for improved handling during the continued fabrication and/or processing of the can. The coating can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans.

Metal coils, having wide application in many industries, are also substrates that can be coated according to the present invention. Coil coatings also typically comprise a colorant.

The coating composition according to the present invention may be applied to at least a portion of the metal substrate. For example, when the coating composition is applied to a monobloc aerosol tube and/or can, the coating composition may be applied to at least a portion of an internal surface of said tube and/or can.

The aqueous coating composition may be applied as a repair coating for component parts of food and beverage cans. For example, as a repair coating for a full aperture easy open end for food cans. This end component may repair coated, after fabrication, by airless spraying of the material on to the exterior of the score line. Other uses as repair coatings include the coating of seams and welds, such as side seams for which the coating may be applied to the area by spraying (airless or air driven) or roller coating. Repair coating can also include protection of vulnerable areas where corrosion may be likely due to damage, these areas include flanges, rims and bottom rims where the coating may be applied by spraying, roller coating flow or dip coating.

The aqueous coating compositions of the present invention may be applied to the substrate, or a portion thereof, as a single layer or as part of a multi layer system. The aqueous coating composition may be applied as a single layer. The aqueous coating compositions may be applied to an uncoated substrate. For the avoidance of doubt an uncoated substrate extends to a surface that is cleaned prior to application. The aqueous coating compositions may be applied on top of another paint layer as part of a multi layer system. For example, the aqueous coating composition may be applied on top of a primer. The aqueous coating compositions may form an intermediate layer or a top coat layer. The aqueous coating composition may be applied as the first coat of a multi coat system. Suitably, the aqueous coating composition may be applied as an undercoat or a primer. The second, third, fourth etc. coats may comprise any suitable paint such as those containing, for example, epoxy resins; polyester resins; polyurethane resins; polysiloxane resins; hydrocarbon resins or combinations thereof. The second, third, fourth etc. coats may comprise polyester resins. The second, third, fourth etc. coats may be a liquid coating or a powder coating.

It will be appreciated by a person skilled in the art that the aqueous coating composition may be applied before or after forming the packaging. For example, the aqueous coating composition may be applied to metal substrate which is then shaped and formed into a metal packaging, or the aqueous coating composition may be applied to the preformed packaging.

The aqueous coating compositions may be applied to a substrate once or multiple times.

The aqueous coating compositions according to the present invention may be applied to the substrate by any suitable method. Methods of applying the aqueous coating compositions according to the present invention will be well known to a person skilled in the art. Suitable application methods for the aqueous coating compositions of the present invention include, but are not limited to the following: electrocoating; spraying; electrostatic spraying; dipping; rolling; brushing; and the like.

The aqueous coating compositions of the present invention may be applied to any suitable dry film thickness. The aqueous coating compositions of the present invention may be applied to a dry film thickness from 2 to 40 microns (μm).

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" first polyester material, "a" powder overcoat aqueous coating composition, "an" undercoat aqueous coating composition, "an" isocyanate resin, "the" residue of "an", and the like, one or more of each of these and any other components can be used. As used herein, the term "polymer" refers to oligomers and both homopolymers and copolymers, and the prefix "poly" refers to two or more. Including, for example and like terms means including for example but not limited to. Additionally, although the present invention has been described in terms of "comprising", the processes, materials, and aqueous coating compositions detailed herein may also be described as "consisting essentially of" or "consisting of".

According to further aspect of the present invention, there is provided an acrylic polyester resin, obtainable by grafting an acrylic polymer with a polyester material, the polyester material being obtainable by polymerizing:
   i) a polyacid component, comprising an ethylenically unsaturated functional monomer operable to impart ethylenically unsaturated functionality on to the polyester resin, such that an acrylic polymer may be grafted onto the polyester material via the use of said ethylenically unsaturated functionality, with
   ii) a polyol component,
   wherein at least one of the polyacid component and/or the polyol component comprises a monomer having an aliphatic group containing at least 15 carbon atoms.

According to further aspect of the present invention, there is provided an acrylic modified polyester resin, obtainable by grafting an acrylic polymer onto a polyester material, the polyester material being obtainable by polymerizing:
   i) a polyacid component, comprising an ethylenically unsaturated functional monomer operable to impart ethylenically unsaturated functionality on to the polyester resin, such that an acrylic polymer may be grafted onto the polyester material via the use of said ethylenically unsaturated functionality, wherein the ethylenically unsaturated functional monomer is selected from one or more of: maleic acid, maleic anhydride and fumaric acid; with
   ii) a polyol component
   wherein at least one of the polyacid component and/or the polyol component comprises a monomer having an aliphatic group containing at least 15 carbon atoms.

According to further aspect of the present invention, there is provided an acrylic modified polyester resin, obtainable by grafting an acrylic polymer onto a polyester material, the polyester material being obtainable by polymerizing:
   i) a polyacid component, comprising an ethylenically unsaturated functional monomer operable to impart ethylenically unsaturated functionality on to the polyester resin, such that an acrylic polymer may be grafted onto the polyester material via the use of said ethylenically unsaturated functionality, wherein the ethylenically unsaturated functional monomer is selected from one or more of: maleic acid, maleic anhydride and fumaric acid;
      the polyacid component further comprising a monomer having an aliphatic group containing at least 15 carbon atoms; with
   ii) a polyol component.

According to a further aspect of the present invention, there is provided an aqueous coating composition, the aqueous coating composition comprising:
   a) an acrylic modified polyester resin, obtainable by grafting an acrylic polymer onto a polyester material, the polyester material being obtainable by polymerizing:
      i) a polyacid component, comprising an ethylenically unsaturated functional monomer operable to impart ethylenically unsaturated functionality on to the polyester resin, such that an acrylic polymer may be grafted onto the polyester material via the use of said ethylenically unsaturated functionality, with
      ii) a polyol component
      wherein at least one of the polyacid component and/or the polyol component comprises a monomer having an aliphatic group containing at least 15 carbon atoms;
   b) a crosslinking material.

According to a further aspect of the present invention, there is provided an aqueous coating composition, the aqueous coating composition comprising:

a) an acrylic modified polyester resin, obtainable by grafting an acrylic polymer onto a polyester material, the polyester material being obtainable by polymerizing:
  i) a polyacid component, comprising an ethylenically unsaturated functional monomer operable to impart ethylenically unsaturated functionality on to the polyester resin, such that an acrylic polymer may be grafted onto the polyester material via the use of said ethylenically unsaturated functionality, wherein the ethylenically unsaturated functional monomer is selected from one or more of: maleic acid, maleic anhydride and fumaric acid; with
  ii) a polyol component,
  wherein at least one of the polyacid component and/or the polyol component comprises a monomer having an aliphatic group containing at least 15 carbon atoms;
b) a crosslinking material.

According to a further aspect of the present invention, there is provided an aqueous coating composition, the aqueous coating composition comprising:
a) an acrylic modified polyester resin, obtainable by grafting an acrylic polymer onto a polyester material, the polyester material being obtainable by polymerizing:
  i) a polyacid component, comprising an ethylenically unsaturated functional monomer operable to impart ethylenically unsaturated functionality on to the polyester resin, such that an acrylic polymer may be grafted onto the polyester material via the use of said ethylenically unsaturated functionality, wherein the ethylenically unsaturated functional monomer is selected from one or more of: maleic acid, maleic anhydride and fumaric acid;
    the polyacid component further comprising a monomer having an aliphatic group containing at least 15 carbon atoms; with
  ii) a polyol component,
b) a crosslinking material.

According to a further aspect of the present invention, there is provided a packaging coated on at least a portion thereof with a coating, the coating being derived from an aqueous coating composition, the aqueous coating composition comprising:
a) an acrylic modified polyester resin, obtainable by grafting an acrylic polymer onto a polyester material, the polyester material being obtainable by polymerizing:
  i) a polyacid component, comprising an ethylenically unsaturated functional monomer operable to impart ethylenically unsaturated functionality on to the polyester resin, such that an acrylic polymer may be grafted onto the polyester material via the use of said ethylenically unsaturated functionality, with
  ii) a polyol component,
  wherein at least one of the polyacid component and/or the polyol component comprises a monomer having an aliphatic group containing at least 15 carbon atoms;
b) a crosslinking material.

According to a further aspect of the present invention, there is provided a packaging coated on at least a portion thereof with a coating, the coating being derived from an aqueous coating composition, the aqueous coating composition comprising:

a) an acrylic modified polyester resin, obtainable by grafting an acrylic polymer onto a polyester material, the polyester material being obtainable by polymerizing:
  i) a polyacid component, comprising an ethylenically unsaturated functional monomer operable to impart ethylenically unsaturated functionality on to the polyester resin, such that an acrylic polymer may be grafted onto the polyester material via the use of said ethylenically unsaturated functionality, wherein the ethylenically unsaturated functional monomer is selected from one or more of: maleic acid, maleic anhydride and fumaric acid; with
  ii) a polyol component,
  wherein at least one of the polyacid component and/or the polyol component comprises a monomer having an aliphatic group containing at least 15 carbon atoms.
b) a crosslinking material.

According to a further aspect of the present invention, there is provided a packaging coated on at least a portion thereof with a coating, the coating being derived from an aqueous coating composition, the aqueous coating composition comprising:
a) an acrylic modified polyester resin, obtainable by grafting an acrylic polymer onto a polyester material, the polyester material being obtainable by polymerizing:
  i) a polyacid component, comprising an ethylenically unsaturated functional monomer operable to impart ethylenically unsaturated functionality on to the polyester resin, such that an acrylic polymer may be grafted onto the polyester material via the use of said ethylenically unsaturated functionality, wherein the ethylenically unsaturated functional monomer is selected from one or more of: maleic acid, maleic anhydride and fumaric acid;
    the polyacid component further comprising a monomer having an aliphatic group containing at least 15 carbon atoms; with
  ii) a polyol component,
b) a crosslinking material.

According to a further aspect of the present invention, there is provided a food or beverage packaging coated on at least a portion thereof with a coating, the coating being derived from an aqueous coating composition, the aqueous coating composition comprising:
a) an acrylic modified polyester resin, obtainable by grafting an acrylic polymer onto a polyester material, the polyester material being obtainable by polymerizing:
  i) a polyacid component, comprising an ethylenically unsaturated functional monomer operable to impart ethylenically unsaturated functionality on to the polyester resin, such that an acrylic polymer may be grafted onto the polyester material via the use of said ethylenically unsaturated functionality, wherein the ethylenically unsaturated functional monomer is selected from one or more of: maleic acid, maleic anhydride and fumaric acid;
    the polyacid component further comprising a monomer having an aliphatic group containing at least 15 carbon atoms; with
  ii) a polyol component,
b) a crosslinking material.

According to a further aspect of the present invention there is provided a method of forming an acrylic modified polyester resin, the method comprising polymerizing an acrylic modification polymer in the presence of a polyester material, the polyester material being obtainable by polymerizing i) a polyacid component, with
   ii) a polyol component, wherein at least one of the polyacid component and/or the polyol component comprises a monomer having an aliphatic group containing at least 15 carbon atoms, and wherein at least one of the polyacid component and/or the polyol component comprises a functional monomer operable to impart functionality on to the polyester resin, such that an acrylic polymer may be grafted onto the polyester material via the use of said functionality.

According to a further aspect of the present invention there is provided a method of forming an acrylic modified polyester resin, the method comprising polymerizing an acrylic modification polymer in the presence of a polyester material, the polyester material being obtainable by polymerizing i) a polyacid component, comprising an ethylenically unsaturated functional monomer operable to impart ethylenically unsaturated functionality on to the polyester resin, such that an acrylic polymer may be grafted onto the polyester material via the use of said ethylenically unsaturated functionality, with
   ii) a polyol component,
   wherein at least one of the polyacid component and/or the polyol component comprises a monomer having an aliphatic group containing at least 15 carbon atoms.

According to a further aspect of the present invention there is provided a method of preparing an aqueous coating composition, the method comprising dispersing an acrylic modified polyester resin and a crosslinking material in an aqueous medium, the acrylic modified polyester resin being obtainable by grafting an acrylic polymer onto a polyester material, the polyester material being obtainable by polymerizing:

i) a polyacid component, with
   ii) a polyol component,
      wherein at least one of the polyacid component and/or the polyol component comprises a monomer having an aliphatic group containing at least 15 carbon atoms, and wherein at least one of the polyacid component and/or the polyol component comprises a functional monomer operable to impart functionality on to the polyester resin, such that an acrylic polymer may be grafted onto the polyester material via the use of said functionality.

According to a further aspect of the present invention there is provided a method of preparing an aqueous coating composition, the method comprising dispersing an acrylic modified polyester resin and a crosslinking material in an aqueous medium, the acrylic modified polyester resin being obtainable by grafting an acrylic polymer onto a polyester material, the polyester material being obtainable by polymerizing:

i) a polyacid component, comprising an ethylenically unsaturated functional monomer operable to impart ethylenically unsaturated functionality on to the polyester resin, such that an acrylic polymer may be grafted onto the polyester material via the use of said ethylenically unsaturated functionality, with
   ii) a polyol component,
   wherein at least one of the polyacid component and/or the polyol component comprises a monomer having an aliphatic group containing at least 15 carbon atoms.

According to a further aspect of the present invention there is provided a method of coating at least a portion of a packaging, the method comprising applying an aqueous coating composition to a packaging, the aqueous coating composition comprising an acrylic modified polyester resin and a crosslinking material, the acrylic modified polyester resin being obtainable by grafting an acrylic polymer onto a polyester material, the polyester material being obtainable by polymerizing:

i) a polyacid component, with
   ii) a polyol component,
      wherein at least one of the polyacid component and/or the polyol component comprises a monomer having an aliphatic group containing at least 15 carbon atoms, and wherein at least one of the polyacid component and/or the polyol component comprises a functional monomer operable to impart functionality on to the polyester resin, such that an acrylic polymer may be grafted onto the polyester material via the use of said functionality, and
curing the aqueous coating composition to form a coating.

According to a further aspect of the present invention there is provided a method of coating at least a portion of a packaging, the method comprising applying an aqueous coating composition to a packaging, the aqueous coating composition comprising an acrylic modified polyester resin and a crosslinking material, the acrylic modified polyester resin being obtainable by grafting an acrylic polymer onto a polyester material, the polyester material being obtainable by polymerizing:

i) a polyacid component, comprising an ethylenically unsaturated functional monomer operable to impart ethylenically unsaturated functionality on to the polyester resin, such that an acrylic polymer may be grafted onto the polyester material via the use of said ethylenically unsaturated functionality, with
   ii) a polyol component,
   wherein at least one of the polyacid component and/or the polyol component comprises a monomer having an aliphatic group containing at least 15 carbon atoms;

and curing the aqueous coating composition to form a coating.

All of the features contained herein may be combined with any of the aspects herein and in any combination.

For a better understanding of the invention, and to show how embodiments of the same may be carried into effect, reference will now be made, by way of example, to the following experimental data.

EXAMPLES

Method for the Formation of the Aqueous Coatings

The details of inventive aqueous coating 1 and comparative aqueous coating 2 are shown in Tables 1 to 4. Coating 1 shows unsaturated, hydroxyl functional polyesters formed from monomers including a monomer having at least 15 carbon atoms (Pripol 1010). Comparative coating 2 shows an unsaturated, hydroxyl functional polyester without a monomer having at least 15 carbon atoms.

The polyester materials of inventive coating 1 and comparative coating 2 were formed as follows. The diol, diacid and catalyst components listed in Table 1 were added as a batch to a vessel with a steam column, distillation head and condenser. The batch temperature is increased to 150° C. with stirring at 400 rpm under an N2 blanket. Once the temperature reaches 150° C., the batch temperature is increased to 230° C. over a 4 hour period (10° C. steps every 30 minutes), whilst ensuring that the head temperature is below 100° C.

Once the batch reaches 230° C., the acid value is assessed every hour. When the acid value is less than 15, the batch is cooled to 150° C. and methyl hydroquinone is added, then after 10 minutes, the maleic anhydride is added and the batch temperature increased to 195° C. until the acid value increases up to <20. The batch is then cooled to 130° C. and azeotropically separated using a Dean Stark trap and an addition of xylene.

The batch is then heated back up to 195° C. When the target AV and cut viscosity is reached the batch is cooled to 150° C. and the Dowanol DPM added. The batch is then held at 150° C. for 1 hour and then poured out.

The polyester materials formed then underwent a grafting process to graft acrylic onto the unsaturated functionality of the backbone of the polyester (imparted by the maleic anhydride) to form acrylic modified polyester resins 1 and 2 (noted simply as PGA resins 1 and 2 in Table 2). Details of the monomers used in the acrylic graft reaction are shown in Table 2.

The acrylic modified polyester resins were each formed as follows. Half of the amount of the polyester material given in Table 2 was added to a vessel with mixing at 225 rpm and heated to 120° C. Once at 120° C., half of total amount of each acrylic monomer as shown in Table 2 was added over a period of 40 minutes with continued stirring. 10 minutes after adding the acrylic monomers, about a third of each of the t-butyl peroctoate initiator and Dowanol DPM amounts as shown in Table 2 were added. The remaining amount of the polyester material was then added and the solution heated back to 120° C. At this stage the solution is homogeneous and has good mixing. Then the remaining acrylic monomers were added over 40 minutes. 10 minutes after adding the acrylic monomers, about a third of each of the t-butyl peroctoate initiator and Dowanol DPM amounts as shown in Table 2 were added over a 30 minute period. The remaining t-butyl peroctoate initiator and Dowanol DPM was then added in two evenly split batches, the first batch being added over 5 minutes and the mixture then held at 120° C. for 30 minutes before addition of the second batch over 5 minutes and then held at 120° C. for 30 minutes. The reaction mixture is then cooled to below 100° C.

The acrylic modified polyester resins are formed into aqueous dispersions with the components as shown in Table 3.

The acrylic modified polyester resins are formed into aqueous dispersions by heating the resin to 90° C., and during heating adding the DMEA with stirring. The mixture was then held for 10 minutes, after which deionized water was added over 60 minutes, maintaining the temperature about 85° C. The aqueous dispersions were then allowed to cool to 45° C.

The aqueous dispersions are formed into aqueous coating compositions with components as shown in Table 4, as follows. The deionized water, Dowanol PnB, crosslinking material (Cymel 1123—benzoguanamine, commercially available from Allnex), and blocked DDBSA catalyst (Nacure 5925, commercially available from King) were stirred into the aqueous dispersion to form the aqueous coating composition.

TABLE 1

Polyesters

| Material | Polyester 1 | Comparative Polyester 2 |
|---|---|---|
| 2-methyl-1,3-propanediol | — | 2157.50 |
| Cyclohexane dimethanol | 924.01 | — |
| TMCD | — | — |
| Trimethylolpropane | 12.62 | 29.24 |
| Isophthalic acid | 695.38 | 1117.50 |
| Pripol 1010 (C36 Dimer Acid) | 765.03 | — |
| Hexahydrophthalic anhydride | — | 619.50 |
| Dibutyl tin oxide | — | 2.93 |
| Cyclohexane-1,4-dicarboxylic acid | — | 1804.50 |
| MeHQ | 0.220 | 0.59 |
| Maleic anhydride | 74.44 | 196.90 |
| Stannous Octoate | 1.27 | |
| Xylene | 118.93 | 705.50 |
| Dowanol DPM | 850.20 | 509.90 |
| Properties | | |
| Initial weight | 2472.80 | 5928.76 |
| Theoretical weight loss | 212.01 | 728.01 |
| Final resin weight | 2260.79 | 5200.74 |
| Total with solids | 3230.09 | 6497.11 |
| % solids | 70.32 | 81.01 |
| Mn | 5,706 | 6,120 |
| Mw | 30,905 | 32,547 |
| PDI | 5.4 | 5.3 |
| AV | 0.45 | 0.70 |
| OH | 13.87 | 19.28 |

TABLE 2

Polyester-graft-acrylic (PGA) Resins

| Material | PGA resin 1 | Comparative PGA resin 2 |
|---|---|---|
| Polyester 1 | 1,688.96 | — |
| Comparative polyester 2 | — | 1,657.57 |
| Methacrylic acid | 78.8 | 77.88 |
| Ethyl methacrylate | 72.24 | 71.39 |
| Methyl methacrylate | 72.24 | 71.39 |
| 2-hydroxyethyl methacrylate | 39.40 | 38.94 |
| t-butyl peroctoate | 36.9 | 36.88 |
| Dowanol DPM | 42.83 | 545.95 |
| Properties | | |
| Final % solids | 59.00 | 59.00 |
| % polyester | 80.52 | 79.90 |
| % acrylic | 17.81 | 17.60 |
| % initiator | 1.67 | 2.50 |
| AV | 22.50 | 20.31 |

TABLE 3

Aqueous Dispersions

| Materials | Aq. Dispersion 1 | Comp. Aq. Dispersion 2 |
|---|---|---|
| PGA resin 1 | 1430.00 | — |
| Comparative PGA resin 2 | — | 1525.00 |
| Dimethylethanolamine | 33.25 | 33.08 |
| Deionised water | 1701.00 | 2123.55 |

TABLE 3-continued

Aqueous Dispersions

|  | Aq. Dispersion 1 | Comp. Aq. Dispersion 2 |
|---|---|---|
| Properties |  |  |
| % solids | 26.00 | 25.32 |
| Acid Value | 9.16 | 21 |
| Particle size, matersizer, μm | 0.290 | 0.119 |

TABLE 4

Coating Compositions

|  | Aq. Coating 1 | Comparative aq. Coating 2 |
|---|---|---|
| Aq. dispersion 1 | 40.00 | — |
| Comparative aq. dispersion 2 | — | 40.00 |
| DI Water | 2.31 | 2.73 |
| Dowanol PnB | 1.07 | 1.13 |
| Cymel 1123 (benzoguanamine) | 1.07 | 1.12 |
| Nacure 5925 (blocked DDBSA) | 0.04 | 0.04 |
| Total | 44.49 | 45.02 |

Testing Methods

Coated panels were obtained by drawing the aqueous coatings over a Zirconium pretreated 5182-H48 aluminum panels using a wire wound rod to obtain dry coating weights of approximately 7.0 mg/square inch (msi). The coated panels were immediately placed into a one-zone, gas-fired, conveyor oven for 10 seconds and baked to a peak metal temperature of 450° F. (232° C.).

Blush resistance measures the ability of a coating to resist attack by various testing solutions. When the coated film absorbs test solution, it generally becomes cloudy or looks white. Blush is measured visually using a scale of 1-10 where a rating of "10" indicates no blush and a rating of "0" indicates complete whitening of the film. Blush ratings of at least 7 are typically desired for commercially viable coatings. The coated panel tested is 2×4 inches (5×10 cm) and the testing solution covers half of the panel being tested so you can compare blush of the exposed panel to the unexposed portion.

Adhesion testing is performed to assess whether the coating adheres to the substrate. The adhesion test is performed according to ASTM D 3359 Test Method B, using Scotch 610 tape, available from 3M Company of Saint Paul, Minn. Adhesion is generally rated on a scale of 0-5 where a rating of "5" indicates no adhesion failure.

The "Acetic Acid" test is designed to measure the resistance of a coating to a boiling 3% acetic acid solution. The solution is prepared by mixing 90 grams of Glacial Acetic Acid (product of Fisher Scientific) into 3000 grams of deionized water. Coated strips are immersed into the boiling Acetic Acid solution for 30 minutes. The strips are then rinsed and cooled in deionized water, dried, and immediately rated for blush and adhesion as described previously.

The "Dowfax" test is designed to measure the resistance of a coating to a boiling detergent solution. The solution is prepared by mixing 5 grams of DOWFAX 2A1 (product of Dow Chemical) into 3000 grams of deionized water. Coated strips are immersed into the boiling Dowfax solution for 15 minutes. The strips are then rinsed and cooled in deionized water, dried, and immediately rated for blush and adhesion as described previously.

The "Joy" test is designed to measure the resistance of a coating to a hot 180° F. (82° C.) Joy detergent solution. The solution is prepared by mixing 30 grams of Ultra Joy Dishwashing Liquid (product of Procter & Gamble) into 3000 grams of deionized water. Coated strips are immersed into the 180° F. (82° C.) Joy solution for 15 minutes. The strips are then rinsed and cooled in deionized water, dried, and immediately rated for blush and adhesion as described previously.

The "DI Water Retort" test is designed to measure the resistance of a coating to deionized water. Coated strips are immersed into the deionized water and placed in a steam retort for 30 minutes at 250° F. (121° C.). The strips are then cooled in deionized water, dried, and immediately rated for blush and adhesion as described previously.

The "1% Citric Acid Retort" test measures the resistance of a coating to 1% Citric Acid. Coated strips are immersed into the 1% citric acid solution and placed in a steam retort for 30 minutes at 250° F. (121° C.). The strips are then cooled in deionized water, dried, and immediately rated for blush and adhesion as described previously.

The results of these testing methods are provided in Table 5.

TABLE 5

Results

| Coating | Wedge Bends (% failure)* | Acetic Acid Blush | Acetic Acid Adhesion | Dowfax Blush | Dowfax Adhesion | Joy Blush | Joy Adhesion | Water Retort Blush | Water Retort Adhesion | 1% citric acid retort blush | 1% citric acid retort adhesion |
|---|---|---|---|---|---|---|---|---|---|---|---|
| Example 1 | 11 | 9 | 4 B | 9 | 5 B | 9 | 5 B | 9 | 5 B | 7.5 | 5 B |
| Comp. Av. Coating 1 | 8 | 9 | 4 B | 9 | 5 B | 9 | 5 B | 9 | 5 B | 3 | 5 B |

*Results <15% are acceptable.

The invention claimed is:

1. An aqueous coating composition comprising:
   a) a graft acrylic polyester resin, obtainable by grafting an acrylic polymer with a polyester material, the polyester material being obtainable by polymerizing:
      i) a polyacid component, with
      ii) a polyol component,
   wherein at least one of the polyacid component and/or the polyol component comprises a monomer having an aliphatic group containing at least 15 carbon atoms;

wherein the polyester material has a gross hydroxyl value of 7 to 40 mg KOH/g;
wherein the aliphatic group-containing monomer is a dimer fatty acid; wherein at least one of the polyacid component and/or the polyol component comprises a functional monomer operable to impart functionality on to the polyester resin, such that an acrylic polymer is grafted with the polyester material via the use of said functionality,
b) a crosslinking material.

2. A packaging coated on at least a portion thereof with a coating, the coating being derived from the aqueous coating composition of claim 1.

3. The coating composition of claim 1, wherein the functional monomer comprises an ethylenically unsaturated monomer.

4. The coating composition of claim 1, wherein the aliphatic group of the aliphatic group-containing monomer comprises from 18 to 50 carbon atoms.

5. The coating composition of claim 1, wherein the aliphatic group-containing monomer is the dimerization product of erucic acid, linolenic acid, linoleic acid, and/or oleic acid.

6. The coating composition of claim 1, wherein the polyacid component comprises the aliphatic group-containing monomer and one or more of the following: dimethyl terephthalate, isophthalic acid, hexahydrophthalic anhydride, cyclohexane 1,4-dicarboxylic acid.

7. The coating composition of claim 1, wherein the polyol component comprises 2,2,4,4-tetraalkylcyclobutane-1,3-diol (TACD), alkylene glycol, ethylene glycol, propylene glycol, diethylene glycol, dipropylene glycol, triethylene glycol, tripropylene glycol, hexylene glycol, polyethylene glycol, polypropylene glycol, neopentyl glycol, hydrogenated bisphenol A, cyclohexanediol, propanediol, 1,2-propanediol, 1,3-propanediol, butyl ethyl propanediol, 2-methyl-1,3-propanediol, 2-ethyl-2-butyl-1,3-propanediol, butanediol, 1,4-butanediol, 1,3-butanediol, 2-ethyl-1,4-butanediol, pentanediol, trimethyl pentanediol, 2-methylpentanediol, cyclohexanedimethanol, hexanediol, 1,6-hexanediol, caprolactonediol, hydroxyalkylated bisphenol, polyether glycol, poly(oxytetramethylene) glycol, trimethylol propane, pentaerythritol, di-pentaerythritol, trimethylol ethane, trimethylol butane, dimethylol cyclohexane, bio-derived polyols, glycerol, sorbitol, and/or isosorbide.

8. The coating composition of claim 1, wherein the polyol component comprises 2-methyl propanediol (2-MPD), 2,2,4,4-tetraalkylcyclobutane-1,3-diol, 2,2,4,4-tetramethylcyclobutane-1,3-diol (TMCD), neopentyl glycol (NPG), 1,4-cyclohexane dimethanol (CHDM), butyl ethyl propane diol (BEPD), trimethylolpropane (TMP), and/or 1,6 hexanediol.

9. The coating composition of claim 1, wherein the polyester material comprises an Mn from 1,000 Daltons (Da=g/mole) to 15,000 Da.

10. The coating composition of claim 1, wherein an acrylic modification polymer is polymerized in the presence of the polyester material to form an acrylic modified polyester resin.

11. The coating composition of claim 1, wherein the acrylic polyester resin has an Mn from 1,000 Daltons (Da=g/mole) to 15,000 Da.

12. The coating composition of claim 1, wherein the crosslinking material comprises one or more of a phenolic resin, melamine, benzoguanamine or aminoplast resin.

13. The coating composition of claim 1, wherein the aqueous coating composition is substantially free of bisphenol A (BPA), bisphenol F (BPF) and derivatives thereof.

14. The coating composition of claim 1, wherein the aqueous coating composition further comprises an adhesion promoter.

15. The coating composition of claim 14, wherein the adhesion promotor comprises an acidic polyester material.

16. The coating composition of claim 15, wherein the acidic polyester material generally comprises the reaction product of:
(a) a polyester having an Mn of 2000 to 10,000, a hydroxyl number of 20 to 75, and an acid value of 15 to 25; the polyester being a polycondensate of:
(i) a polyol component comprising a mixture of diols and triols,
(ii) a polyacid component comprising an alpha, beta-ethylenically unsaturated polycarboxylic acid,
and
(b) a phosphorus acid.

17. The coating composition of claim 1, wherein the coating composition has a solids content of from 10 to 60%, 15 to 50 wt %, or 20 to 40 wt % by weight of the coating composition.

18. The coating composition of claim 1, wherein the polyacid component is substantially free of sulfonated monomer.

19. The coating composition of claim 1 is an electrodeposited coating composition.

20. A powder coating composition, the powder coating composition comprising:
a) a graft acrylic polyester resin, obtainable by grafting an acrylic polymer with a polyester material, the polyester material being obtainable by polymerizing:
i) a polyacid component, with
ii) a polyol component,
wherein at least one of the polyacid component and/or the polyol component comprises a monomer having an aliphatic group containing at least 15 carbon atoms;
wherein the aliphatic group-containing monomer is a dimer fatty acid;
wherein at least one of the polyacid component and/or the polyol component comprises a functional monomer operable to impart functionality on to the polyester resin, such that an acrylic polymer is grafted with the polyester material via the use of said functionality,
wherein the polyester material has a gross hydroxyl value of 5 to 50 mg KOH/g;
b) a crosslinking material.

* * * * *